US011200807B2

(12) United States Patent
Beaurepaire

(10) Patent No.: US 11,200,807 B2
(45) Date of Patent: Dec. 14, 2021

(54) METHOD AND APPARATUS FOR DETECTING AN AVAILABILITY OF A VEHICLE BASED ON PARKING SEARCH BEHAVIORS

(71) Applicant: HERE GLOBAL B.V., Eindhoven (NL)

(72) Inventor: Jerome Beaurepaire, Berlin (DE)

(73) Assignee: HERE Global B.V., Eindhoven (NL)

( * ) Notice: Subject to any disclaimer, the term of this patent is extended or adjusted under 35 U.S.C. 154(b) by 158 days.

(21) Appl. No.: 16/139,961

(22) Filed: Sep. 24, 2018

(65) Prior Publication Data

US 2020/0098271 A1    Mar. 26, 2020

(51) Int. Cl.
| | | |
|---|---|---|
| *G08G 1/00* | (2006.01) | |
| *G05D 1/02* | (2020.01) | |
| *G08G 1/14* | (2006.01) | |

(52) U.S. Cl.
CPC ............. *G08G 1/20* (2013.01); *G05D 1/0291* (2013.01); *G08G 1/14* (2013.01)

(58) Field of Classification Search
CPC G08G 1/20; G08G 1/14; G08G 1/145; G08G 1/141; G08G 1/0104; G08G 1/0112; G05D 1/0291; G06Q 10/02; G06Q 10/06; G06Q 10/0631; G06Q 10/0639; G06Q 10/0637; G06Q 10/08; G06Q 10/087; G06Q 50/30; G60Q 30/0645; G01C 21/3438; G01C 21/343; G01C 21/34; G01C 21/3415; G01C 21/3617
USPC .......... 701/410, 117, 400; 705/5; 340/932.2, 340/994
See application file for complete search history.

(56) References Cited

U.S. PATENT DOCUMENTS

| | | | | |
|---|---|---|---|---|
| 7,257,552 | B1* | 8/2007 | Franco .................... | G06Q 10/08 |
| | | | | 705/26.2 |
| 7,936,284 | B2* | 5/2011 | Levine ................... | G08G 1/143 |
| | | | | 340/928 |
| 9,734,713 | B2* | 8/2017 | Levy ....................... | G08G 1/147 |
| 10,311,733 | B2* | 6/2019 | Sofra ..................... | B60W 40/10 |
| 10,424,202 | B1* | 9/2019 | Beaurepaire ....... | G06K 9/00637 |
| 2003/0120522 | A1* | 6/2003 | Uyeki ..................... | G06Q 10/02 |
| | | | | 705/5 |
| 2006/0276960 | A1* | 12/2006 | Adamczyk ............. | G06Q 10/06 |
| | | | | 701/516 |
| 2009/0164924 | A1* | 6/2009 | Flake .................. | G06F 16/9535 |
| | | | | 715/764 |
| 2009/0234729 | A1* | 9/2009 | Boss ...................... | G06Q 50/10 |
| | | | | 705/5 |

(Continued)

FOREIGN PATENT DOCUMENTS

JP      2004178385 A    6/2004

*Primary Examiner* — Richard A Goldman
(74) *Attorney, Agent, or Firm* — Ditthavong, Steiner & Mlotkowski

(57) ABSTRACT

An approach is provided for shared vehicle availability detection based on vehicle trajectory information. A vehicle sharing platform determines that a vehicle is engaged in a parking search behavior, wherein the vehicle is in use by a current user. The vehicle sharing platform further computes a probability that the vehicle will become available for use by another user based on the parking search behavior. The vehicle sharing platform further designates the availability of the vehicle for use by the another user based on the probability.

20 Claims, 14 Drawing Sheets

(56) References Cited

U.S. PATENT DOCUMENTS

| | | | |
|---|---|---|---|
| 2010/0052946 A1* | 3/2010 | Levine | G08G 1/144 340/932.2 |
| 2013/0124320 A1* | 5/2013 | Karner | B60L 53/68 705/14.54 |
| 2014/0059545 A1* | 2/2014 | Flake | G06F 9/45533 718/1 |
| 2015/0029041 A1* | 1/2015 | Liu | G07F 17/24 340/932.2 |
| 2015/0242944 A1* | 8/2015 | Willard | G06Q 30/0284 705/5 |
| 2015/0254581 A1* | 9/2015 | Brahme | G06F 16/29 705/5 |
| 2015/0260537 A1* | 9/2015 | MacNeille | H04W 4/024 701/400 |
| 2015/0371153 A1* | 12/2015 | Lohmeier | G06Q 40/025 705/5 |
| 2015/0379437 A1* | 12/2015 | Reich | G06Q 10/02 705/5 |
| 2015/0379784 A1* | 12/2015 | Gotz | G06Q 30/0201 701/29.1 |
| 2016/0171885 A1* | 6/2016 | Lynch | G08G 1/0129 701/117 |
| 2016/0334232 A1* | 11/2016 | Zhuang | G01C 21/3438 |
| 2017/0123423 A1* | 5/2017 | Sako | G08G 1/123 |
| 2017/0193627 A1* | 7/2017 | Urmson | G06Q 50/30 |
| 2017/0200368 A1* | 7/2017 | Levine | G06K 9/00892 |
| 2017/0270447 A1* | 9/2017 | Borean | G06Q 10/06313 |
| 2017/0293950 A1* | 10/2017 | Rathod | G06Q 30/0639 |
| 2017/0313353 A1* | 11/2017 | Huang | G01C 21/3407 |
| 2017/0346915 A1* | 11/2017 | Gay | H04L 67/2842 |
| 2018/0012149 A1* | 1/2018 | Yust | G06Q 20/3224 |
| 2018/0225734 A1* | 8/2018 | Towal | G06Q 10/06 |
| 2019/0043121 A1* | 2/2019 | Barnes | G06Q 20/127 |
| 2019/0075203 A1* | 3/2019 | Suzuki | G08G 1/144 |
| 2019/0105995 A1* | 4/2019 | Prasad | B60L 53/63 |
| 2019/0137291 A1* | 5/2019 | Rong | G06Q 10/02 |
| 2019/0163826 A1* | 5/2019 | Arquero | G06N 20/00 |
| 2019/0391579 A1* | 12/2019 | Khurgin | G01V 9/00 |
| 2020/0098271 A1* | 3/2020 | Beaurepaire | G08G 1/14 |
| 2020/0158525 A1* | 5/2020 | Rakah | G08G 1/0129 |

* cited by examiner

METHOD AND APPARATUS FOR DETECTING AN AVAILABILITY OF A VEHICLE BASED ON PARKING SEARCH BEHAVIORS

BACKGROUND

Service providers and device manufacturers (e.g., wireless, cellular, etc.) are continually challenged to deliver value and convenience to consumers by, for example, providing compelling network services. One area of interest has been the development of location based services to provide shared vehicle availability information to the users. For example, in areas (e.g., city centers, residential areas, etc.) where shared vehicles are allowed to use on-street parking but no shared vehicles is available in sight, finding or waiting for an available shared vehicle can be difficult and takes time. Moreover, collecting data to determine shared vehicle availability information at these locations can also be difficult (e.g., resource intensive, lack of available data points at a particular location, etc.). Accordingly, service providers face significant challenges to facilitating shared vehicle availability detection from available shared vehicle information.

SOME EXAMPLE EMBODIMENTS

Therefore, there is a need for an approach for detecting an availability of a vehicle based on parking search behaviors.

According to one embodiment, a method comprises determining that a vehicle is engaged in a parking search behavior, wherein the vehicle is in use by a current user. The method also comprises computing a probability that the vehicle will become available for use by another user based on the parking search behavior. The method further comprises designating the availability of the vehicle for use by the another user based on the probability.

According to another embodiment, an apparatus comprises at least one processor, and at least one memory including computer program code for one or more computer programs, the at least one memory and the computer program code configured to, with the at least one processor, determines that a vehicle is engaged in a parking search behavior, wherein the vehicle is in use by a current user. The apparatus is also caused to compute a probability that the vehicle will become available for use by another user based on the parking search behavior. The apparatus is further caused to designate the availability of the vehicle for use by the another user based on the probability.

According to another embodiment, a computer-readable storage medium carries one or more sequences of one or more instructions which, when executed by one or more processors, cause, at least in part, an apparatus to determine that a vehicle is engaged in a parking search behavior, wherein the vehicle is in use by a current user. The apparatus is also caused to compute a probability that the vehicle will become available for use by another user based on the parking search behavior. The apparatus is further caused to designate the availability of the vehicle for use by the another user based on the probability.

According to another embodiment, an apparatus comprises means for determining that a vehicle is engaged in a parking search behavior, wherein the vehicle is in use by a current user. The apparatus also comprises means for computing a probability that the vehicle will become available for use by another user based on the parking search behavior.

The apparatus further comprises means for designating the availability of the vehicle for use by the another user based on the probability.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting an availability of a vehicle based on parking search behaviors are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
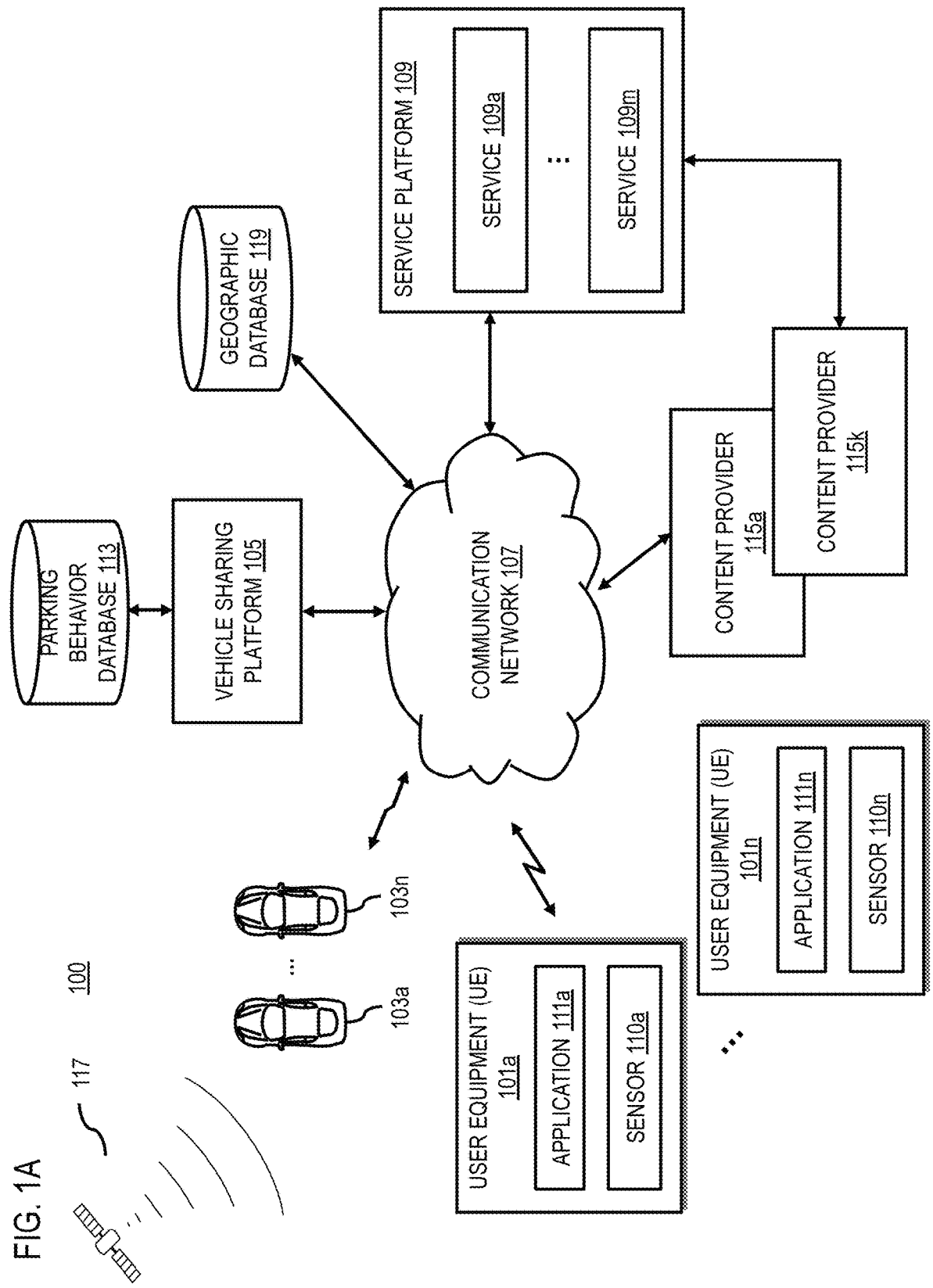
FIG. 1A is a diagram of a system for detecting an availability of a vehicle based on parking search behaviors, according to one embodiment.

FIG. 1A is a diagram of a system for detecting an availability of a vehicle based on parking search behaviors, according to one embodiment. As discussed above, finding an available shared vehicle can be time consuming and frustrating, particularly in city centers or other similar areas where shared vehicles may be limited or the number of requesting users is high. Historically, navigation systems (e.g., embedded car navigation systems) may offer assistance in these situations by indicating available shared vehicles (e.g., cars, motorcycles, electric bikes, electric scooters, bicycles, boats, airplanes, etc. that are human-operated, semi-autonomous, or autonomous) that are nearby on a mapping or navigation interface. The presentation of the available shared vehicles typically is triggered when a user selects an shared vehicle icon on the mapping or navigation interface while approaches a known or predicted location. However, when there is no shared vehicle in the vicinity of the user, while shared vehicle destinations are not known or cannot be predicted accurately, the systems may not predict shared vehicle availability before the vehicles are parked. Moreover, the presentation of available shared vehicles typically also do not provide information on total passenger capacity, available passenger capacity, and remaining gasoline in the shared vehicles.

To the extent that traditional systems provide shared vehicle availability information, these systems mainly exploit knowledge at the end points of a journey (after the vehicles are parked) to extract the shared vehicle availability information. However, this traditional method does not estimate shared vehicle availability.

To address this problem, a system 100 of FIG. 1A introduces a capability to estimate the availability of shared vehicles based on parking search behaviors before the vehicles are parked (as opposed, e.g., to after the vehicles are parked in traditional methods). The system 100 can determine shared vehicle availability information (e.g., either the availability of shared vehicles or the unavailability of shared vehicles) based on parking search behaviors of vehicles. By way of example, the embodiments of the approach described herein are based parking search behaviors, such as driving at lower speed next to a parked lane and going "in circles" around a central point, i.e., the destination, and all the streets browsed by a driver who is searching for a parking space can be assumed to be full or otherwise undesirable for parking. The parking spaces may span any geographic boundary (e.g., neighborhoods, cities, regions, etc.) that include a variety of road segments or other parking facilities. The parking spaces may be free parking spaces, metered parking spaces, time restricted parking spaces, temporary stopping spaces, temporary pick-up and drop-off zones, etc.

In one embodiment, for each journey extracted from vehicle trajectory data collected from vehicles (e.g., cars) traveling in a road or travel network in the vicinity of a user, the system 100 identifies a vehicle that initiates or performing a parking search prior to it reaches a parking space, based on, for example, parking search behaviors.

In one embodiment, the system 100 includes one or more processes for automatically detecting if and where in a journey a driver started searching for parking and an online service collecting this information and providing guidance to other users to find shared vehicles faster.

In one embodiment, UEs 101 of a driver and sensors in a vehicle 103 are collecting and reporting data to the system 100. In this way, for instance, the drivers of the associated vehicles can have an incentive to use the system for sharing trajectory data and receiving shared vehicle supply and demand information. With the information, the system 100 (e.g., a vehicle sharing platform 105) can compute a probability of a vehicle becoming available in the vicinity of the user. In this way, the system 100 can more precisely present to the user soon-to-be-available shared cars nearby and within a preferred time frame, such as 10 minutes. In one embodiment, the UEs 101 and the vehicle sharing platform 105 have connectivity via a communication network 107.

In one embodiment, the data-collecting vehicles 103a-103n are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data. By way of example, the sensors 110 may include location sensors (e.g., GPS), accelerometers, compass sensors, gyroscopes, altimeters, etc. In one embodiment, the trajectory data can be segmented into "journeys". Journeys, for instance, are the pieces or portions of the trajectory data that can be separated into distinct segments. In one embodiment, journeys are delimited by parking search events. For example, a parking search event may be detected when it is determined that a vehicle's is circling around, etc.

In one embodiment, after a journey or the trajectory data is recorded (e.g., upon parking), the trajectory data is analyzed (e.g., by respective applications 111a-111n and/or the vehicle sharing platform 105 for storage in, for instance, a parking behavior database 113 and/or a geographic database 119) to detect which part of the journey (if any) correspond to a parking search. A list of street or travel segments covered by the parking search (if any) is then generated. In one embodiment, timestamp information indicating at which time the street segment was traveled or browsed is also included with the list. In one embodiment, the list is then transmitted or uploaded to the vehicle sharing platform 105. In addition or alternatively, the raw trajectory data may be uploaded to the vehicle sharing platform 105 to determine the travel segments covered by the parking search and associated timestamp information. In yet another embodiment, the list and/or trajectory data may be maintained at the UE 101 device for local processing to determine shared vehicle availability information for transmission to the vehicle sharing platform 105 and/or other vehicles/UEs 101 (e.g., when operating in a peer-to-peer network architecture).

In one embodiment, the vehicle sharing platform 105 is configured to monitor vehicles in the vicinity of the user that exhibit parking search behaviors in order to generate shared vehicle availability information. In addition, the vehicle sharing platform 105 may present to the user shared vehicles precited as available in the vicinity of the user and within a desired time frame. In one embodiment, information on points of interest, parking areas, road segments, and/or related information are stored in the geographic database 119. In addition or alternatively, the information can be provided by the service platform 109, one or more services 109a-109m (also collectively referred to as services 109), one or more content providers 115a-115k (also collectively referred to as content providers 115), or a combination thereof. For example, the sources of the information may include map data, information inferred from data collected from participating vehicles, or a combination thereof.

In one embodiment, the vehicle sharing platform 105 receives lists of visited travel segments and/or trajectory data for determining the visited travel segments from a plurality of participating UEs 101. The received information may also be associated with timestamp information and/or other contextual information to store in the parking behavior database 113. As previously noted, the vehicle sharing platform 105 can infer from the irregular driving patterns that the drivers are checking these travel or street segments for parking in the area. In one embodiment in which timestamp information is available, for each travel or street segment of interest, the vehicle sharing platform 105 retains the latest time at which a vehicle is parked and calculates an average time to park in a given area at a given time, this could be used by the system 100 to estimate when the vehicle will be available at which location. For example, the vehicle sharing platform 105 can maintain one timestamp (or any number of configured timestamps) with shared vehicle availability information in parking behavior database 113.

In one embodiment, when a driver UE 101 requests instructions to find parking in a given area or location, the vehicle sharing platform 105 computes a route spanning the streets or travel segments close to a vehicle requesting user, when there is not delay of the estimated arrival time.

In one embodiment, apart from an optimal or recommended parking search route, the vehicle sharing platform 105 may also send the information as a map overlay that illustrates, for instance, timestamps, a number of shared vehicles available, and fluctuations in the amount of available shared vehicles, etc. around the a selected location or position (e.g., a current location of the client UE 101). This mode of operation may be used, for instance, when a precise target destination of the requesting user is not known.

In one embodiment, vehicles 103 are equipped with a navigation device (e.g., a UE 101) that is capable of submitting requests for a shared vehicle to the vehicle sharing platform 105, and of guiding a driver of the vehicle along a received navigation route. In one embodiment, as the driver follows the received route, the UE 101 (e.g., via a navigation application 111) in vehicle 103 may iterate the parking instruction request to the vehicle sharing platform 105 and update the resulting route periodically in case updated shared vehicle supply and demand information has been transmitted to or generated by the vehicle sharing platform 105.

In one embodiment, requests for shared vehicles can be triggered by interactions with a user interface of the UE 101 (e.g., an explicit request from a user without any vehicle or a driver wanting a different vehicle later), or automatically when the driver or vehicle approaches a target destination (e.g., a set destination, an inferred destination, and/or any other known destination). In yet another embodiment, the UE 101 can initiate a shared vehicle request when the UE 101 detects that the user mentions a shared vehicle search in an email, calendar entry, web post, etc. In this way, shared vehicle information can be provided even when no explicit shared vehicle request is set or known by the system 100.

As shown in FIG. 1A, the vehicle sharing platform 105 operates in connection with UEs 101 and vehicles 103 for providing shared vehicle availability information based on parking search behavior information or other data. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating state classification.

Also, the UEs 101 may be configured with navigation applications 111 for interacting with one or more content providers 115, services of the service platform 109, or a combination thereof. Per these services, the navigation applications 111 of the UE 101 may acquire parking search instructions, navigation information, location information, mapping information and other data associated with the current location of the vehicle, a direction or movement of the vehicle along a roadway, etc. Hence, the content providers 115 and service platform 109 rely upon the gathering of vehicle trajectory data and parking search behaviors data for executing the aforementioned services.

The UEs 101 may be configured with various sensors 110 for acquiring and/or generating trajectory data regarding a vehicle, a driver, other vehicles, conditions regarding the driving environment or roadway, etc. For example, sensors 110 may be used as GPS receivers for interacting with one or more satellites 117 to determine and track the current speed, position and location of a vehicle travelling along a roadway. In addition, the sensors 110 may gather tilt data (e.g., a degree of incline or decline of the vehicle during travel), motion data, light data, sound data, image data, weather data, temporal data and other data associated with the vehicle and/or UEs 101 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle or a communicable traffic system (e.g., traffic lights, traffic cameras, traffic signals, digital signage). In one embodiment, the vehicle sharing platform 105 aggregates probe data gathered and/or generated by the UEs 101 resulting from the driving of multiple different vehicles over a road/travel network. The probe data may be aggregated by the vehicle sharing platform 105 to parking search behavior classification.

By way of example, the vehicle sharing platform 105 may be implemented as a cloud based service, hosted solution or the like for performing the above described functions. Alternatively, the vehicle sharing platform 105 may be directly integrated for processing data generated and/or provided by service platform 109, content providers 115, and/or applications 111. Per this integration, the vehicle sharing platform 105 may perform client-side shared vehicle availability calculation based on vehicle trajectory information and/or parking search detection.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, vehicle sharing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
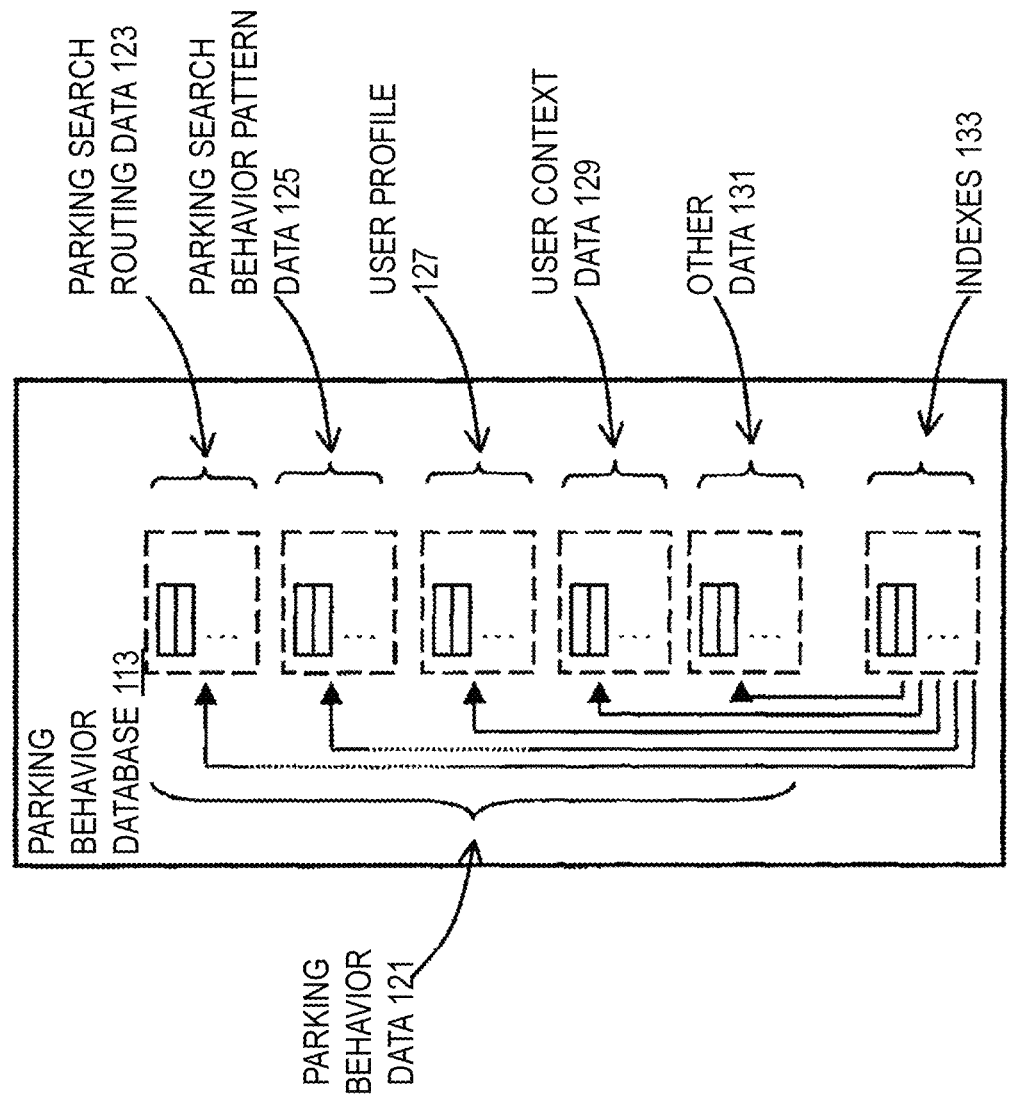
FIG. 1B is a diagram of a parking behavior database, according to one embodiment.

FIG. 1B is a diagram of the parking behavior database 113, according to one embodiment. In one embodiment, shared vehicle availability information and/or any other information used or generated by the system 100 with respect to detecting an availability of a vehicle based on parking search behavior data 121 stored in the parking behavior database 113, and associated with and/or linked to the geographic database 119 or data thereof.

In one embodiment, the parking behavior data 121 include parking search route data 123, parking search behavior pattern data 125, user profile data 127, user context data 129, other data 131, indexes 133, etc. In one embodiment, the parking search route data 123 can include any data item used by the vehicle sharing platform 105 including, but not limited to parking search route data, timestamp information for the parking search route data, etc. for estimating a destination (e.g., point of interest, a parking space, etc.) and an estimated arrival time for a vehicle to the destination nearby the requesting user within a desired time frame. In one embodiment, the parking search behaviors pattern data 125 can include any data item used by the vehicle sharing platform 105 including, but not limited to driving in a circle around a destination, etc. for identifying one or more shared vehicles that are searching for a parking space. In one embodiment, the list of streets and available parking spaces can be provided by the vehicles 103 and/or UEs 101 which also collect and report the parking search route data 123 and the parking search behavior pattern data 125 to a cloud including the parking behavior database 113.

In one embodiment, the user profile data 127 includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the driver/requesting user.

In one embodiment, the user context data 129 includes, but not limited to, driver context data, requesting user context data, etc. The driver context data includes, but not limited to, vehicle sensor data, a destination of the driver, a type of the destination of the driver, traffic data around the destination of the driver (e.g., a point of interest, a parking space, etc.), a proximity of the requesting user location or a vehicle handover location to the destination of the driver, availability of an alternate destination for the driver, a number of passengers accompanying the driver, a historical pattern regarding the availability of the vehicle, etc. The requesting user context data includes, but not limited to, a destination of the requesting user, a type of the destination of the requesting user, traffic data around the requesting user location, a proximity of the requesting user location to a vehicle handover location or the destination of the driver, availability of an alternate destination for the requesting user, a number of passengers accompanying the requesting user, weather data in the vicinity of the requesting user, etc.

More, fewer or different data records can be provided. One or more portions, components, areas, layers, features, text, and/or symbols of the parking behavior data records can be stored in, linked to, and/or associated with one or more of the data records of the geographic database 119 (such as mapping and/or navigation data).

In one embodiment, the geographic database 119 includes geographic data used for (or configured to be compiled to be used for mapping and/or navigation-related services, such as for route information, service information, estimated time of arrival information, location sharing information, speed sharing information, and/or geospatial information sharing, according to exemplary embodiments. For example, the geographic database 119 includes node data records, road segment or link data records, POI data records, parking availability data records, and other data records.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records. The geographic database 119 can also include data about places, such as cities, towns, or other communities, and other geographic features, such as bodies of water, mountain ranges, etc.

In one embodiment, the parking availability data records can include any data item used by the vehicle sharing platform 105 including, but not limited to parking areas, travel segments within the parking areas to monitor, number of spaces, parking availability information, timestamp information for the parking availability information, fluctuation information about the parking availability information, trajectory data, timestamps associated with the trajectory data, etc.

The parking behavior database 113 and/or the geographic database 119 can be maintained by the content provider in association with the service platform 109 (e.g., a map developer). The map developer can collect driving/parking data and geographic data to generate and enhance the parking behavior database 113 and/or the geographic database 119. There can be different ways used by the map developer to collect data. These ways can include obtaining data from other sources, such as municipalities or respective geographic authorities.

The parking behavior database 113 and/or the geographic database 119 can be stored in a format that facilitates updating, maintenance, and development. For example, the data in the parking behavior database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the parking behavior database 113 and the geographic database 119 are separated databases, but in alternate embodiments, the parking behavior database 113 and the geographic database 119 are combined into one database that can be used in or with end user devices (e.g., UEs 101) to provided navigation-related functions and provide shared vehicle information. For example, the databases 113, 119 are assessible to the UE 101 directly or via the vehicle sharing platform 105. In another embodiments, the databases 113, 119 can be downloaded or stored on UE 101, such as in applications 111.

Figure 2:
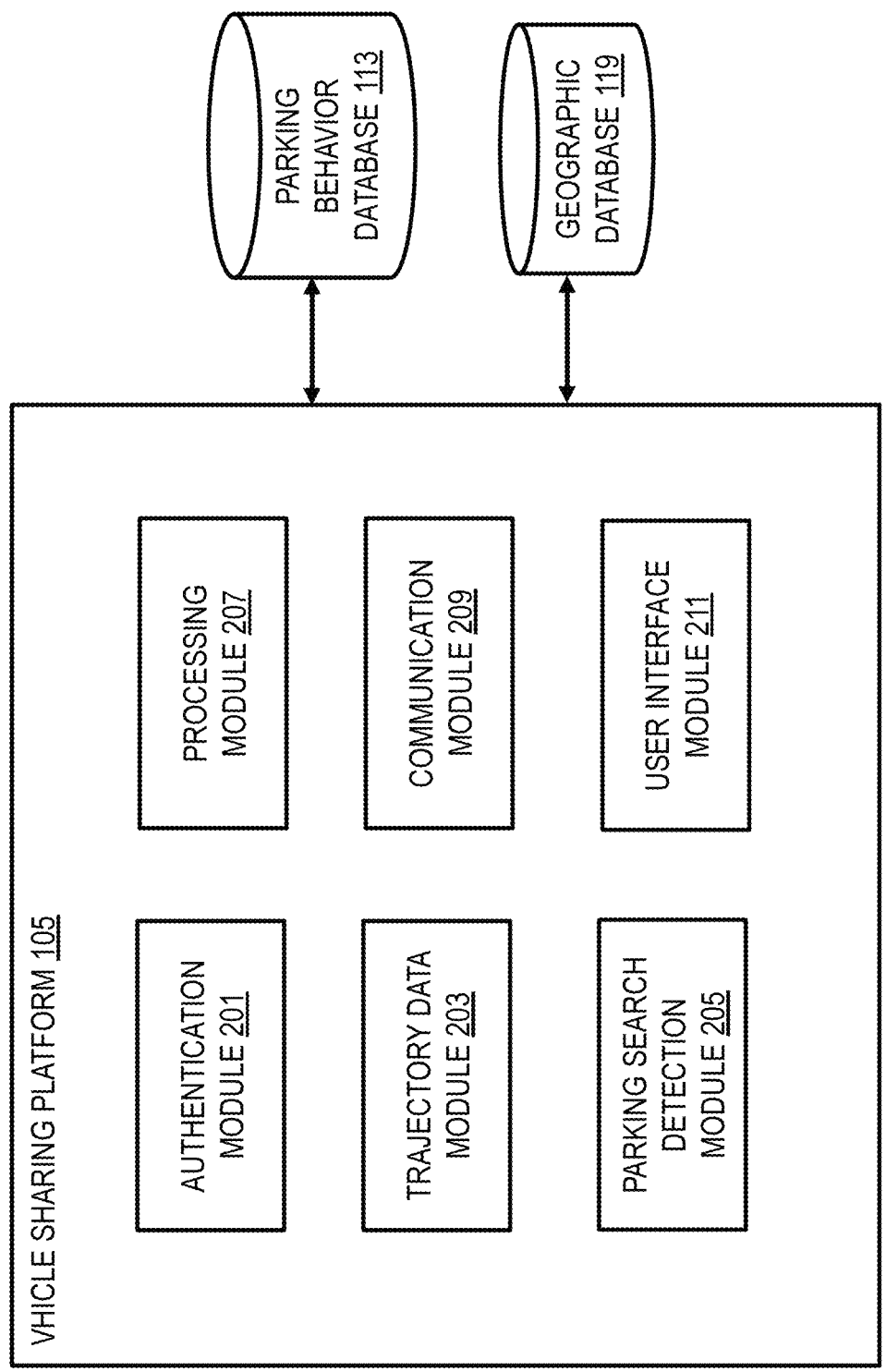
FIG. 2 is a diagram of the components of a vehicle sharing platform, according to one embodiment.

FIG. 2 is a diagram of the components of a vehicle sharing platform, according to one embodiment. By way of example, the vehicle sharing platform 105 includes one or more components for detecting an availability of a vehicle based on parking search behaviors. It is contemplated that the functions of these components may be combined or performed by other components of equivalent functionality. In this embodiment, the vehicle sharing platform 105 includes an authentication module 201, a trajectory data module 203, a parking search detection module 205, a processing module 207, a communication module 209, and a user interface module 211.

In one embodiment, the authentication module 201 authenticates drivers/vehicles and/or associated UEs 101 for interaction with the vehicle sharing platform 105. By way of example, the authentication module 201 receives a request to access the vehicle sharing platform 105 via an application 111. The request may be submitted to the authentication module 201 via the communication module 209, which enables an interface between the navigation application 111 and the platform 105. In addition, the authentication module 201 may provide and/or validate access by the UE 101 to upload trajectory data, lists of travel segments classified as under a parking search, timestamp information for the segments searched, and/or other location-based information to the platform 105. In one embodiment, the authentication module 201 may further be configured to support and/or validate the formation of profile by a provider of a service 109 or content provider 115, e.g., for supporting integration of the capabilities for detecting an availability of a vehicle based on parking search behaviors with said providers 115 or services 109.

The trajectory data module 203 collects and/or analyzes trajectory data (including associated timestamps) as generated by one or more authenticated UE 101. For example, the trajectory data module 203 aggregates the trajectory data and or lists of searched travel segments generated by the UE 101. In one embodiment, the trajectory data module 203 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101 that transmitted the trajectory data or lists.

In one embodiment, unprocessed trajectory data are received from the UEs 101, and the trajectory data module 203 interacts with the parking search detection module 205 to initiate processing of the trajectory data to perform parking search detection. In one embodiment, the parking search detection module 205 uses machine learning classification to detect which portions of journeys determined from trajectory data correspond to parking searches or parking search behaviors. It is noted that machine learning-based detection of parking search behavior is provided by way of illustration and not as a limitation. In other embodiments, the vehicle sharing platform 105 can use any method to determine when a vehicle begins its parking search. For example, the vehicle or driver can transport a message or input to indicate that it has started a parking search, the has been detected executing a maneuver (e.g., multiple U-turns) that is highly correlated with a parking search. In other words, parking search behaviors can be automatically determined by the vehicle sharing platform 105 (e.g., using machine learning or other automated) and/or specified manually by a driver of the vehicle. The examples discussed below illustrate an example of machine-learning based processing steps that can be applied to trajectory data that is not well delimited with respect to journeys and modes of transport (e.g., vehicular and non-vehicular traffic may be combined).

By way of example, the parking search detection module 205 can initiate the machine learning process by processing training data (e.g., raw trajectory data or tracks collected from UEs 101 or received from one or more track data sources such as content providers 115 and/or services 109). In one embodiment, the training data consists of tables of GPS positions (e.g., timestamp, latitude, longitude, altitude, speed, heading, etc.) associated to an anonymized user identifier (e.g., corresponding to a contributing UE 101 or vehicle). Depending on the originating data source, some of the trajectory data or tracks are map-matched and some are not. Accordingly, the parking search detection module 205 may perform map-matching as needed to associate the parking search routes with known street or travel segments.

In one embodiment, the parking search detection module 205 can identify the travel segments in a journey track of a vehicle and then annotate those segments with attributes that indicate the segment is associated with driving or parking searching. Accordingly, finding individual parking searching features for each vehicle in the vicinity of a requesting user can indicate a parking search is the goal of the vehicle.

In one embodiment, parking search detection module 205 detects a parking search by processing trajectory data according to known algorithms. In one embodiment, the parking search detection module 205 can detect an initiation of a parking search by a vehicle by processing trajectory data based on the assumption that drivers typically take near-to-optimal routes to reach a destination (e.g., in the sense of a shortest or fastest route to a destination). However, this optimality may no longer be present when a driver starts looking for a parking space. For example, the system 100 can use a trained machine learning classifier to determine a threshold value for distinguishing an optimal track from a parking search track. The driver typically tries to find a parking spot right at or as near as possible to the destination and then explores the street or travel network around this spot with increasing distance. In many cases, this exploration is performed in an "irregular" process whereby driving behavior may deviate from normal routines or become erratic (e.g., paths doubling back on itself, intersecting itself repeatedly, etc.).

In one embodiment, the parking search detection module 205 can be limited to processing journeys or trajectory data segments delimited by parking search events. In this way, the system 100 is more likely to exclude irregular trajectories or non-optimal tracks resulting from when a driver is lost (which may not end with a parking search event and continue once a driver is no longer lost). It yet another embodiment, it is contemplated that the parking search detection module 205 can use other criteria to detect and/or exclude specific parking search behavior. For example, parking search behavior might be indicated if a driven track shows self-intersections, have street segments that are driven multiple times, etc. Additionally, when searching of parking, a vehicle's or driver's speed profile might be slower or more irregular than average for a given travel segment, the vehicle may be located in a lane next to a parking lane, etc.

In one embodiment, the processing module 207 determines that a vehicle searching for parking is available to arrive at a location within a threshold distance from the location of the requesting user and within the time frame using known vehicle booking or sharing prediction algorithms for a giving location at specific time.

For example, the processing module 207 calculates a probability D which a joint probability distribution or matrix for parameters X, Y, Z . . . that gives the probability that each of X, Y, Z . . . falls in any particular range or discrete set of values specified for that variable. For example, X is a driver's profile parameter (e.g., licensed to drive passenger vehicles or not), and Y is a is a driver's context parameter (e.g., three of four times that the driver temporarily parked a shared car at the destination and one out of four times that the driver terminated the use of the vehicle, at the destination). To simplify the discussion, only X and Y are used to generate a joint probability distribution or matrix as Table 1 as follows:

TABLE 1

|  | X = licensed | X = not licensed | P(Y) |
|---|---|---|---|
| Y = stop | (1)(¾) = ¾ | (0)(¾) = 0 | ¾ + 0 = ¾ |
| Y = terminate | (1)(¼) = ¼ | (0)(¼) = 0 | ¼ + 0 = ¼ |
| P(X) | ¾ + ¼ = 1 | 0 + 0 = 0 | |

For most shared vehicles, when parked, the system 100 asks the driver whether to terminate the rental use of the vehicle or simply to park/stop and then resume the rental use later (reserving the vehicle). If the driver chooses "terminate", the vehicle would be advertised parking as available for another user.

As the described idea is about determining a probability that a person is about to "terminate" the use of the vehicle, the system would monitor other factors that influence this probability. For example, this driver never uses the "terminate" option when using the shared vehicle navigation to work, so it is most likely that the driver is not going to "terminate" at work this time. As another example, this driver sometimes uses the "park/stop" option but when he goes an airport, not near his house/flat. The system 100 can monitor the driver's profile and historic and current driving behaviors and computes the probability accordingly. If no or fewer data is available, then the uncertainty increases.

Probability is the measure of how likely an event is to occur out of the number of possible outcomes. There exist infinitely many outcomes among many drivers in the vicinity of the requesting user. To simplify the discussion, the probability D in this case, can be identified with a triple (x,y,z) that specifies the probabilities of the driver will drive to the destination of the driver, the driver will drive to an available parking space (near the destination of the driver and the location of the requesting user), and the driver will drive to a handover location (also near the destination of the driver and the location of the requesting user) respectively. x+y+z=1 and x,y,z are positive. In one embodiment, the other outcomes are not of interest for computing the probability D that the vehicle will become available for the requesting user. In another embodiment, the other outcomes have no statistical significance for computing the probability D that the vehicle will become available for requesting user.

There also exist infinitely many triples (x,y,z) that satisfy the conditions above (for examples are x=z=2/5, y=1/5 and x=1/3, y=1/6, z=1/2). Each probability P of an outcome is a combined probability of a series of concurrent and/or sequential events that lead to the outcome P (x and y and z)–P (x)×P (y)–P (z). For example, the outcome of driving to an available parking space p requires: the parking space is available (x), the parking space is near the destination of the driver (y), and the destination is near the location of the next user (z). By analogy, each probability of an event x, y, or z is a combined probability of a series of concurrent and/or sequential sub-events that lead to the event x, y, or z.

In one embodiment, the processing module 207 includes more parameters including additional driver's context parameters such as sensor data from the vehicle (e.g., door events, engine stop events), user calendar, user activity, etc., and/or additional driver's profile parameters such as driving history, etc., to calculate the probability D that the vehicle searching for parking is available to arrive at a location within a threshold distance from the location of the requesting user and within the time frame. When the probability D meets or exceeds a threshold value, the processing module 207 determines the vehicle searching for parking is available to arrive at a location within a threshold distance from the location of the requesting user and within the time frame, and prepares data for presenting the share vehicle at the location on a user interface to the requesting user.

In one embodiment, the processing module 207 determines that a vehicle searching for parking is available to arrive at a location within a threshold distance from the location of the requesting user and within the time frame by calculating a probability D which a joint probability distribution or matrix for parameters/attributes X, Y, Z . . . that gives the probability that each of X, Y, Z . . . falls in any particular range or discrete set of values specified for that variable. For example, X is a driver's profile parameter (e.g., licensed to drive passenger vehicles or not), and Y is a is a driver's context parameter (e.g., three of four times that the driver temporarily parked a shared car at the destination and one out of four times that the driver terminated using a shared car, at the destination). To simplify the discussion, only X and Y are used to generate a joint probability distribution or matrix as Table 2 as follows:

TABLE 2

|  | X = licensed | X = not licensed | P(Y) |
| --- | --- | --- | --- |
| Y = stop | (1)(¾) = ¾ | (0)(¾) = 0 | ¾ + 0 = ¾ |
| Y = terminate | (1)(¼) = ¼ | (0)(¼) = 0 | ¼ + 0 = ¼ |
| P(X) | ¾ + ¼ = 1 | 0 + 0 = 0 | |

In one embodiment, the processing module 207 determines a user waiting probability W of the requesting user to wait for the vehicle based on this requesting user's context and profile. When the user waiting probability W meets or exceeds a threshold value, the processing module 207 determines the requesting user to wait for the vehicle at a location within a threshold distance from the location of the requesting user, and optionally, prepares data for presenting the requesting user at the location on a user interface to the driver.

A vehicle handover probability H of an outcome that the driver handovers the vehicle to the requesting user will be a product of the probability D and the probability W. When the vehicle handover probability H meets or exceeds a threshold value, the processing module 207 determines the driver will handover the vehicle to the requesting user at a location within a threshold distance from the location of the requesting user and within the time frame, and prepares data for presenting the share vehicle at the location on a user interface to the requesting user as well as data for presenting the requesting user at the location on a user interface to the driver.

The above-discussed embodiments refer to vehicle handover for car-sharing as examples. These embodiments are applicable to centralized ride-sharing, peer-to-peer ride-sharing, car-pooling, taxi cabs, food delivery, etc.

In one embodiment, once a parking search is inferred based on the observed parking search behavior data or from a driver's parking request, the processing module 207 can interact with the communication module 209 and/or the user interface module 211 to present the shared vehicle availability information, related navigation instructions, and/or other information related to shared vehicle availability determined for the requesting user.

For example, the processing module 207 can provide information to support the requesting user in finding an available shared vehicle by applying knowledge of recent parking search requests of drivers nearby. Because the system 100 enables shared vehicle availability information to be inferred from segments that have been searched during a parking search journey, the system 100 is able to provide shared vehicle availability information for more street or travel segments even if the trajectory data are sparse.

It is further noted that the user interface module 211 may operate in connection with the communication module 209 to facilitate the exchange of parking search detection information and/or shared vehicle availability information via the communication network 107 with respect to the services 109, content providers 115 and applications 111. Alternatively, the communication module 209 may facilitate transmission of the parking search detection information and/or the shared vehicle availability information directly to the services 109 or content providers 115.

The above presented modules and components of the vehicle sharing platform 105 can be implemented in hardware, firmware, software, or a combination thereof. Though depicted as a separate entity in FIG. 1A, it is contemplated that the platform 105 may be implemented for direct operation by respective UEs 101. As such, the vehicle sharing platform 105 may generate direct signal inputs by way of the operating system of the UE 101 for interacting with the application 111. In another embodiment, one or more of the modules 201-211 may be implemented for operation by respective UEs 101 as a platform 105, cloud based service, or combination thereof.

Figure 3:
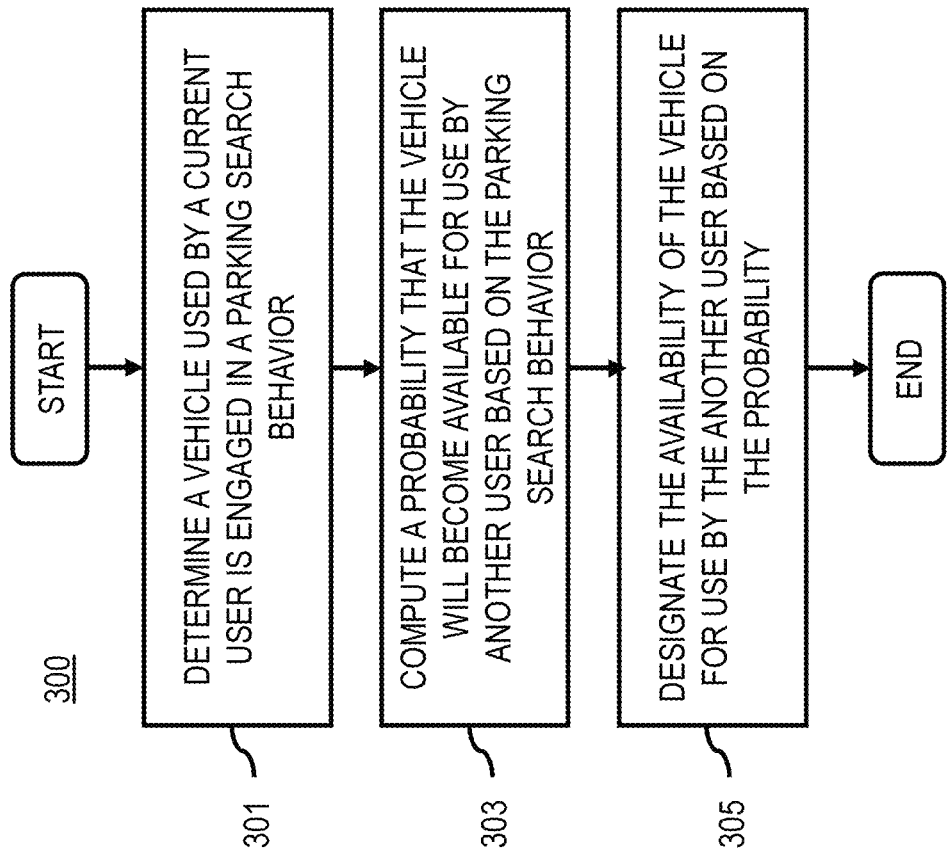
FIG. 3 is a flowchart of a process for detecting an availability of a vehicle based on parking search behaviors, according to one embodiment.
Figure 8:
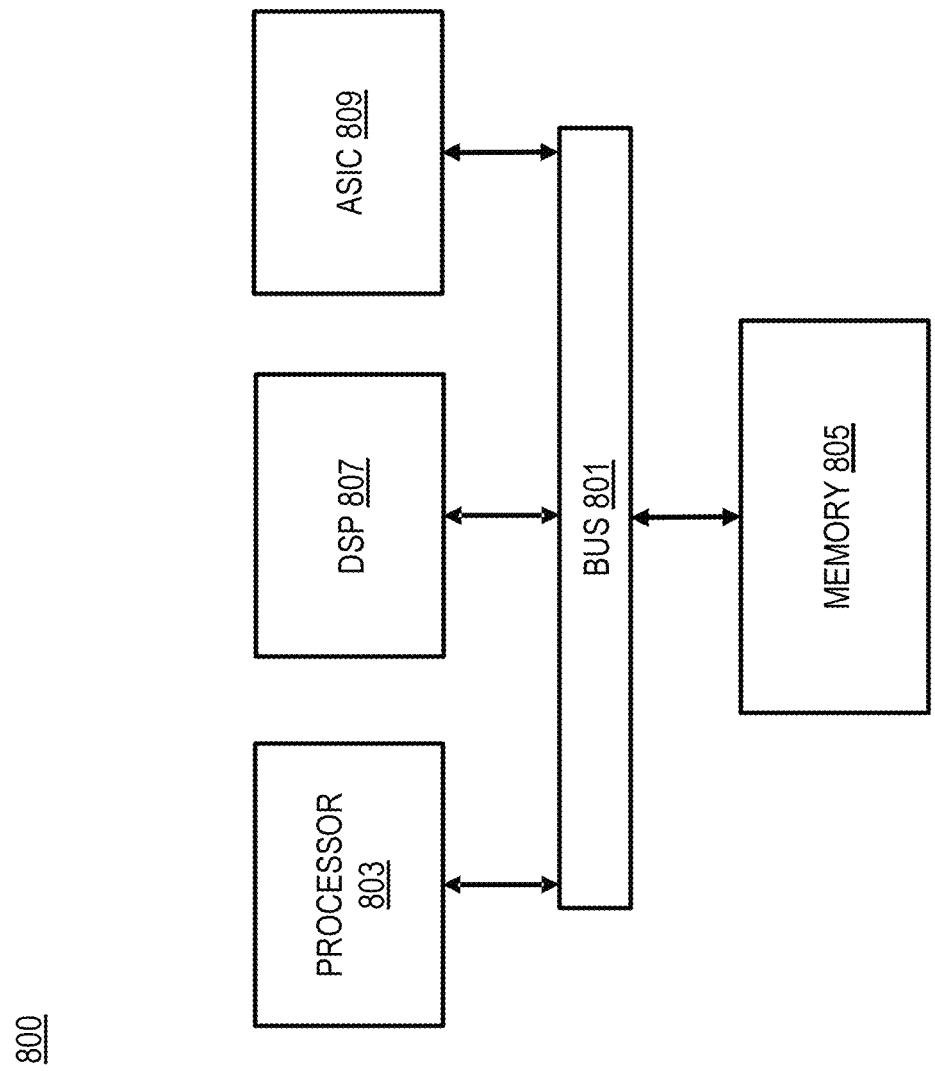
FIG. 8 is a diagram of a chip set that can be used to implement an embodiment of the invention.

FIG. 3 is a flowchart of a process for detecting an availability of a vehicle based on parking search behaviors, according to one embodiment. In one embodiment, the vehicle sharing platform 105 performs the process 300 and is implemented in, for instance, a chip set including a processor and a memory as shown in FIG. 8. In addition or alternatively, all or a portion of the process 300 may be performed locally at the UE 101 (e.g., via the application 111 or another equivalent hardware and/or software component).

In step 301, the vehicle sharing platform 105 checks vehicles around a user and determines that at least one vehicle is engaged in a parking search behavior based on existing parking monitoring and predicting algorithms, wherein the vehicle is in use by another user. In one embodiment, the vehicle checking is triggered by a user request. In another embodiment, the vehicle sharing platform 105 checks/monitors based on a checking frequency setting set by the user, the system 100, or a factory default. Such checking frequency may be set as continuously after a trigger and/or periodically (e.g., per one or more seconds, one or more minutes, one or more hours, etc.). Such trigger may be an appointment and/or event alert from the user's calendar, a package receipt time indicated in an email, a call, message, and/or text, etc. In one embodiment, the driver pre-registers with the system 101, in order to participate in the vehicle sharing services. In another embodiment, the user may register with and/or authenticate by the system 101 previously or on site, in order to use the vehicle sharing services.

As discussed above, the vehicle sharing platform 105 can process the trajectory data to determine when a vehicle has started a parking search. For example, based on the parking search route data 123 and the parking search behavior pattern data 125 of drivers in this area and the particular of this driver, the vehicle sharing platform 105 determines that the driver has begun a parking search as the vehicle nears a destination in the vicinity of the user.

The vehicle sharing platform 105 extends outward or around from the destination to predict an available parking space that will be used by the driver. For example, the vehicle sharing platform 105 can perform a map matching of the portion of the parking search route data and the parking search behavior pattern data of the driver and track that associated with the determined parking search.

In step 303, the vehicle sharing platform 105 computes a probability that the vehicle will become available for use by the user based, at least in part, on the parking search behavior. Additional discussion of processes for vehicle availability probability are described above with respect to FIGS. 1B and 2 and as follows. The vehicle sharing platform 105 can use any available parking behavior data 121 including parking search route data 123, parking search behavior pattern data 125, user profile data 127, user context data 129, and other data 131 to compute the vehicle availability probability. The parking search behavior pattern data 125 may be crowd sourced to include individual drivers' parking search behaviors at an area of interest.

By example, a user is in a suburb residential area and does not see any shared vehicles or designated shared vehicle areas in sight, so the user queries via UE 101 for vehicle availability within 10 minutes and 3-minute walk from the current location. In one embodiment, the vehicle sharing platform 105 calculates a vehicle availability probability based on driver's profile and/or context parameters, including but not limited to, driver's estimated arrival time to the driver's destination to meet the next user within 10 minutes (e.g., 80%), and a probability that the driver terminates using the vehicle at the destination (e.g., 95%).

In one embodiment, the driver reports to the vehicle sharing platform 105 that the driver is trying to park (while the parking space and time are still unknown) or that the driver has found a parking space (while still needs time to maneuver into the parking space, such as waiting on another vehicle to leave the space). The vehicle sharing platform 105 factors the information in computing the vehicle availability probability, proceeds to step 305.

In one embodiment, the vehicle sharing platform 105 calculates an average parking search time in the vicinity of the destination at a given time of the day based on the estimated arrival time of the user, the parking search route data 123, and/or the parking search behavior pattern data 125, in order to determine that the vehicle will finish parking before the user's arrival (via walking) from the vehicle's current location. In another embodiment, the driver does not really need to use a parking space but a stopping spot to handover the vehicle to the next user who is ready to take the car in a few minutes.

Therefore, the probability for the driver to arrive at the destination (3-minute walk from the user) in 10 minutes is 76%. Since 76% is higher than the next user required vehicle availability probability threshold (e.g., 75%), the vehicle sharing platform 105 proceeds to step 305. However, when the computed probability is lower than the next user required vehicle availability probability threshold, the vehicle sharing platform 105 can report to the user that there is no shared vehicle satisfying the user's need, or prompt the user to adjust the available time frame requirement, the walking distance and/or time threshold, and/or the vehicle availability probability threshold.

In one embodiment, the vehicle sharing platform 105 slightly adjusts the driver's route (via the navigation system of the vehicle) to pass closer to the next driver when the re-routing has no impact on the estimated arrival tome to the driver's destination or when the re-routing increases the chances of finding a parking space. In another embodiment, the vehicle sharing platform 105 informs the driver that the a user (or several users) is waiting for a shared car in the vicinity of the driver's destination, and prompts the driver to decide whether to route to pass closer to the next driver when the re-routing has no impact on the estimated arrival time to the driver's destination or when the re-routing increases the chances of finding a parking space.

In another embodiment, the vehicle sharing platform 105 further calculates a handover probability based on the next user's profile and/or context parameters, including but not limited to, user's walking tolerance from the current location to a handover location (e.g., 85%), a walking distance and/or time threshold (e.g., 3 minutes), and a waiting time threshold at the handover location (e.g., 7 minutes). The handover location maybe the driver's destination or within 0.2 mile of the driver's destination. Therefore, the probability for the next user to walk up to 3 minutes to the handover location and wait for 7 minutes is 88%. The vehicle handover probability is the product of 75% and 88%, i.e., 66%. Since 66% is higher than the next user required vehicle handover probability threshold 65%, the vehicle sharing platform 105 proceeds to step 305. However, when the computed probability is lower than the next user required vehicle handover probability threshold, the vehicle sharing platform 105 can report to the user that there is no shared vehicle satisfying the user's need, or prompt the user to adjust the available time frame requirement, the walking distance and/or time threshold, and/or the vehicle handover probability threshold.

In another embodiment, the user queries the vehicle sharing platform 105 to compute how long the user will wait and/or how far the user will walk to be almost guaranteed (e.g., 95%) to get a shared vehicle. For example, the user has some spare time before the next appointment/event and would like to "know" whether there are options with much higher vehicle availability probability. Using the method described previously, the vehicle sharing platform 105 increases the available time frame requirement and/or the walking distance and/or time threshold, computes a probability curve based on the time and distance requirements, and determines at least one vehicle that will be available within 0.5 miles in the next 20 minutes (with 95% probability). The vehicle sharing platform 105 then proceeds to step 305. However, when the there is no such vehicle available, the vehicle sharing platform 105 can report to the user that there is no shared vehicle satisfying the user's need of 95%, or prompt the user to adjust the vehicle availability probability threshold to below 95%.

In some embodiments for ride-sharing and lift-sharing, when the next user does not have an operator license for the vehicle or does not wish to drive the vehicle, the vehicle sharing platform 105 calculates the vehicle availability probability further based on a number of vacant seats in the vehicle, a probability that the driver's routes are overlapping with the requesting user's route, and/or a probability that the driver is willing to detour to dropoff the user at a location close enough to the user's destination. When the ride-sharing vehicle availability probability is higher than the rider required threshold (e.g., 75%), the vehicle sharing platform 105 proceeds to step 305. However, when the computed probability is lower than the next user required vehicle availability probability threshold, the vehicle sharing platform 105 can report to the user that there is no shared vehicle satisfying the user's need, or prompt the user to adjust the available time frame requirement, the walking distance and/or time threshold, and/or the vehicle availability probability threshold.

Other parameters/attributes to be included in the shared vehicle availability calculation are a proximity of the vehicle to a destination specified by the current user, traffic data at the destination, a type of the destination, vehicle sensor data, a proximity to a vehicle drop off area, weather data, availability of an alternate destination for the current user, a number of passengers accompanying the current user, a historical pattern regarding the availability of the vehicle, etc. Each of the parameters/attributes has various effects on the share vehicle probability and the handover probability. For example, the closer a parking space is to the driver's destination, the more likely the driver is to park the vehicle when the parking spot is free. As another example, the heavier traffic jam is around the driver's destination, the earlier the driver wants to park in order to reduce spending time in traffic.

For all the vehicles in the vicinity of the user, the vehicle sharing platform 105 computes a probability that the vehicle will become available for use by the user as discussed. There vehicles may be owned by private individuals, and/or various vehicle-sharing and ride-sharing entities (e.g., public agencies, commercial vendors, etc.).

The computation of the different embodiments mentioned previously can be done partially or totally on servers/cloud, or at the edge of the network in order to balance the network load/cellular usage.

In step 305, the vehicle sharing platform 105 designates the availability of the vehicle for use by the next user based on the probability. As described, the vehicle sharing platform 105 designates the vehicle as available for use by the requesting user when the computed probability matches or exceeds a threshold (e.g., 75%). The threshold may be set by the requesting user, the system 100, or a factory default. In one embodiment, the vehicle sharing platform 105 presents one or more records of shared vehicle availability records to the user as shown in FIGS. 9A-9C. In one embodiment, based on the requesting user input, the vehicle sharing platform 105 provides data for initiating a reservation of the vehicle. In another embodiment, the vehicle sharing platform 105 provides data to the driver, the vehicle, or a combination thereof indicating at least one of: that another user is requesting the availability of the vehicle, and that the vehicle need not find parking and can transfer directly to the other user.

Figure 4:
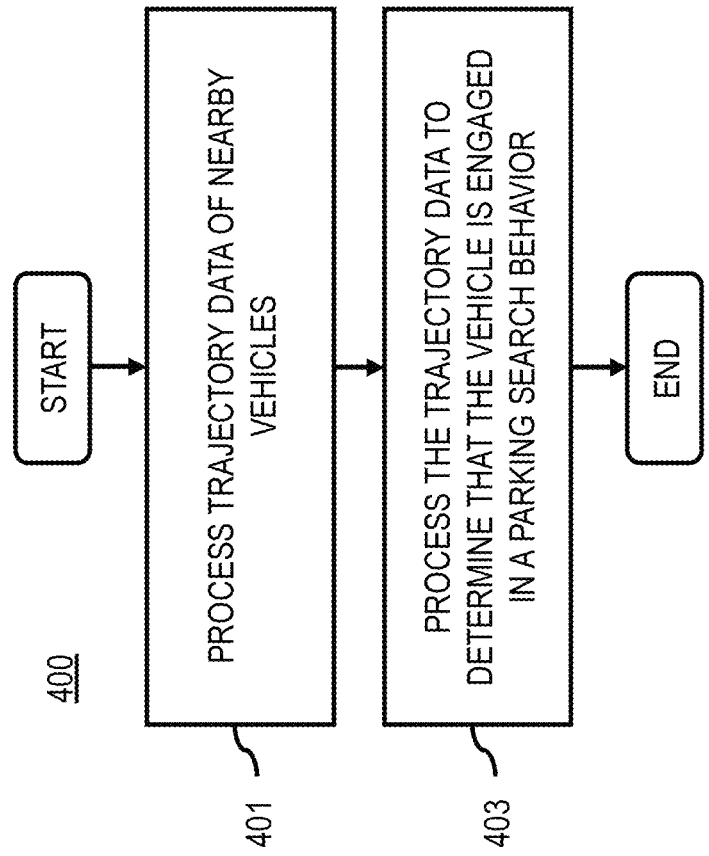
FIG. 4 is a flowchart of a process for determining an initiation of a parking search based on trajectory data, according to one embodiment.

FIG. 4 is a flowchart of a process for determining an initiation of a parking search based on trajectory data, according to one embodiment. In one embodiment, the vehicle sharing platform 105 performs the process 400 and is implemented in, for instance, a chip set including a processor and a memory as shown in FIG. 8. In addition or alternatively, all or a portion of the process 400 may be performed locally at the UE 101 (e.g., via the application 111 or another equivalent hardware and/or software component). In addition or alternatively to the process described with respect to FIG. 4, the vehicle sharing platform 105 can also determine when a parking search is initiated by looking for parking search related behaviors.

For example, in step 401, the vehicle sharing platform 105 retrieves trajectory data for one or more vehicles nearby the requesting user. In step 403, the vehicle sharing platform 105 processes the trajectory data to determine that the vehicle is engaged in a parking search behavior. In one embodiment, the one or more parking search behaviors include, at least in part, but are not limited to one or more self-intersections of at least one driven track, driving multiple times over the one or more street segments, a slower speed profile, travel in an urban area or area with known shared vehicles, driving next to one or more known parking lanes, or a combination thereof.

In one embodiment, the vehicle sharing platform 105 evaluates the track to determine whether any of the behaviors are observed in the data. In some embodiments, the vehicle sharing platform 105 can query for additional sensor data (e.g., engine operation status, door lock status, location of key—inside/outside of car, etc.) to facilitate determine specific parking search behaviors. For example, the vehicle sharing platform 105 can create a trajectory or sensor data profile and/or related criteria to associate with each monitored parking search behavior. These profiles can be used to for comparison against the observed tracks and/or sensor data for a vehicle of interest.

Parking search behaviors are very depending on the vehicle types. For example, parking would then be less of an issue for bicycles and scooters since they may park on sidewalks, hence detecting that such a "vehicle" suddenly goes on a sidewalk and reduces speed as a parking search behavior which indicates the bicycle or scooter will be availability for the user soon.

Figure 5A:
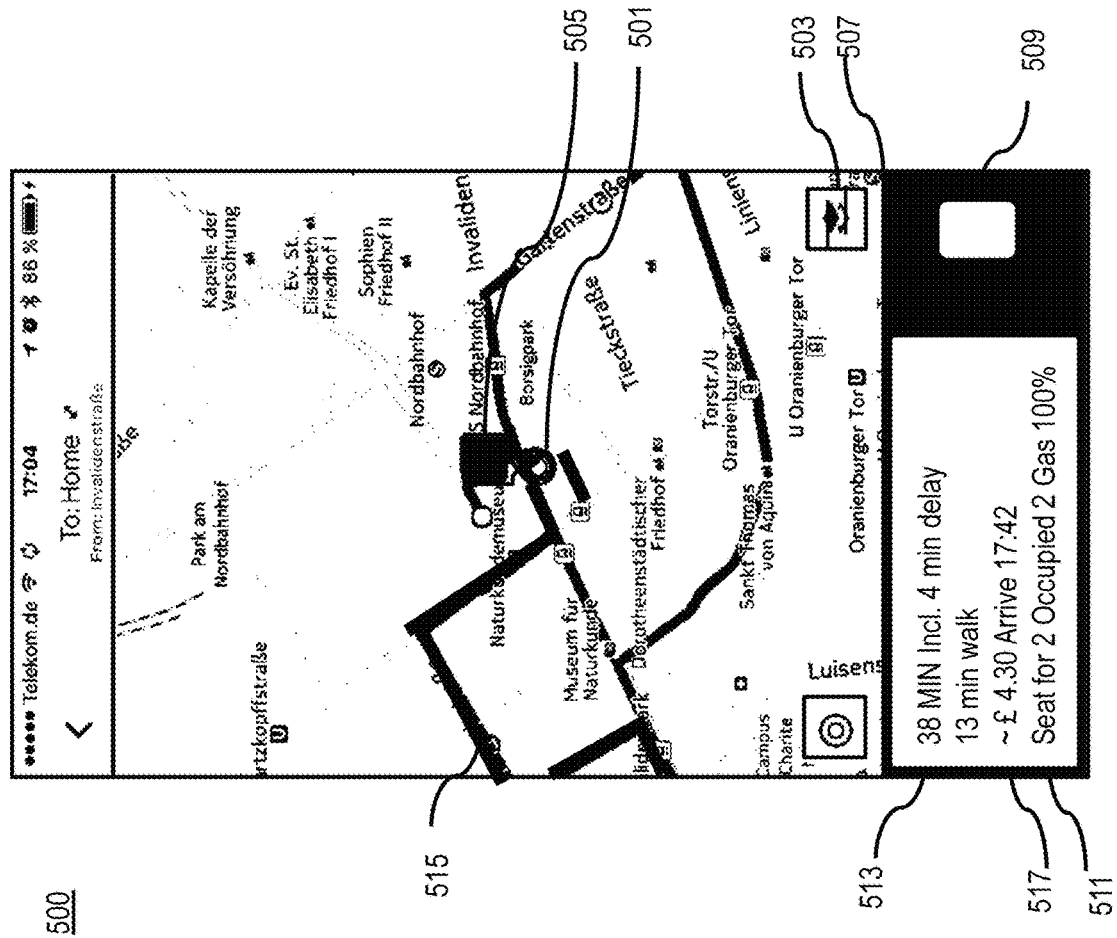
FIGS. 5A-5C are diagrams of user interfaces used in the processes for detecting an availability of a vehicle based on parking search behaviors, according to various embodiments.
Figure 5B:
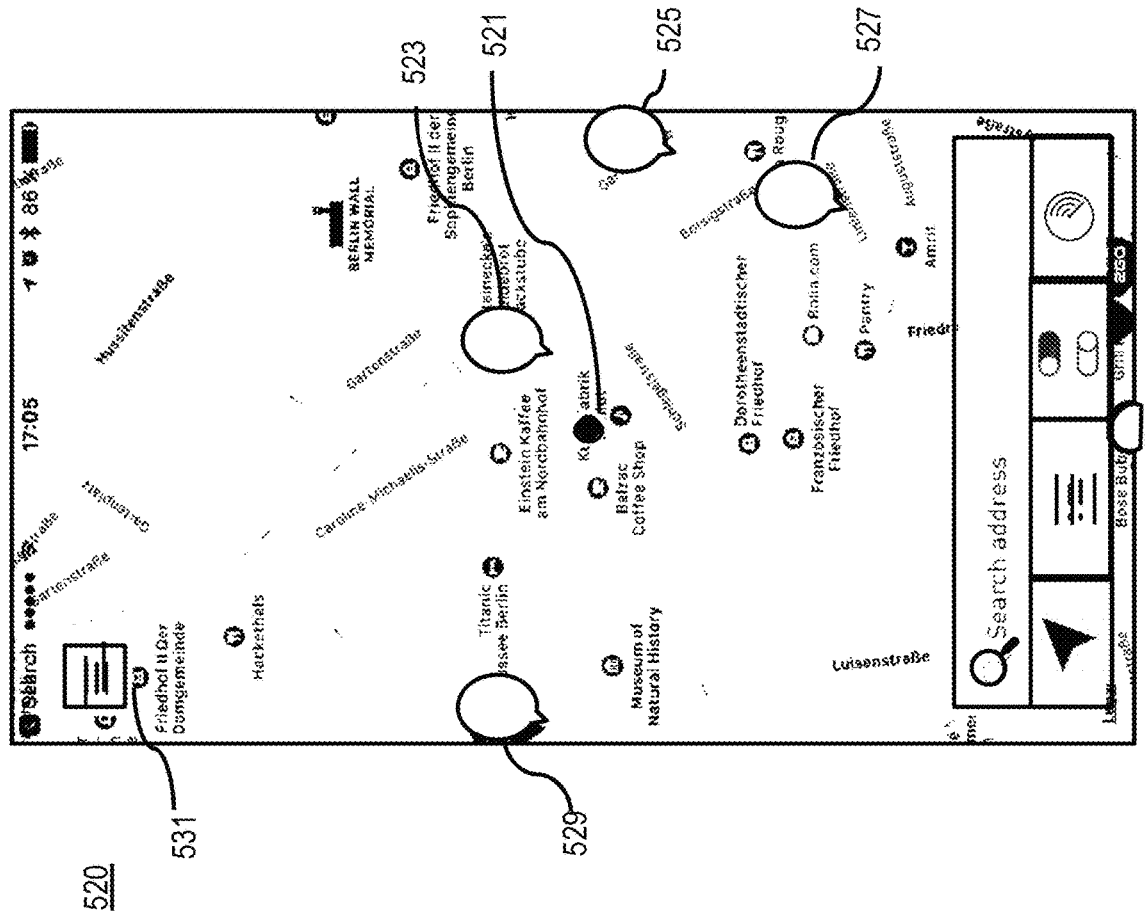
Figure 5C:
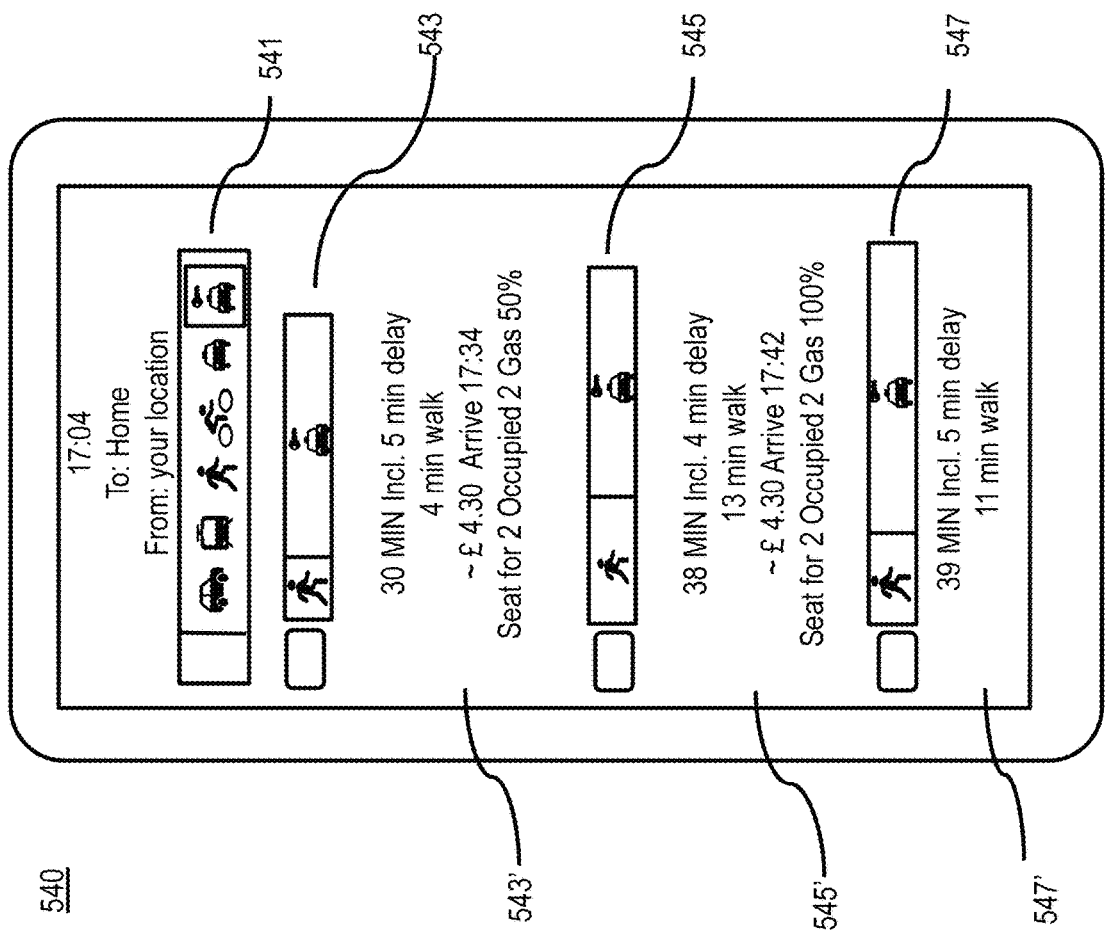

FIGS. 5A-5C are diagrams of user interfaces used in the processes for detecting an availability of a vehicle based on parking search behaviors, according to various embodiments. More specifically, FIGS. 5A-5C illustrate user interfaces that can be used in real-time by UEs 101 (FIG. 5A-5B) and vehicles 103 (FIG. 5C) participating in a shared vehicle availability service provided by the system 100.

As shown in FIG. 5A, a user interface (UI) 500 presents a user location 501. When the user selects a vehicle sharing icon 503, a popup box 505 and/or a preview banner 507 are depicted on UI 500. UI 500 also shows no shared vehicle is searching for parking in the vicinity of the user. The preview banner 507 depicts a vehicle information icon 511 and detailed information of an optimum shared vehicle available for the user determined based of the previously discussed shared vehicle availability. The user can trigger the display of information of more shared vehicle (not shown) by selecting the more vehicle information icon 511 or the popup box 505. Such an optimum shared vehicle may be the best shared vehicle that satisfies the requesting user's criteria (such as available in 10 minutes and within 3-minute walking distance), or that does not satisfy the requesting user's criteria as shown in FIG. 5A. In this embodiment, the preview banner 507 depicts the optimum shared vehicle characteristic information 511 as including a 2-people vehicle, occupied by two people, and with a 100% full gasoline tank. The preview banner 507 also depicts the optimum shared vehicle showing up information 513 as showing up in 4 minutes at a location that requires 13-minute walk, while the mapping interface highlights the walking route 515 to the location (not shown as outside of current map representation). The preview banner 507 further depicts the optimum shared vehicle arrival information 517 with a cost (e.g., £4.30) arriving at 17:42 at the requesting user's destination (e.g., home) which is 38 minutes from now (17:04). Unfortunately, this vehicle is not a feasible option for the user, since it arrives the location before the user can walk to it.

FIG. 5B illustrates a UI 520 from the requesting user device's perspective. This example is similar to the example of FIG. 5A. For example, as shown, the UI 520 presents a user location 521 with four vehicles searching for parking in the vicinity of the requesting user shown as four popup boxes 523, 535, 527, 539. When the user selects a vehicle sharing icon 531, a new screen open as UI 540 in FIG. 5C. UI 540 shows a transport option bar 541 (including car, public transport, walking, cycling, taxi, and shared vehicle) and detailed information 543, 545, 547 of each of three vehicles available for the user determined based of the previously discussed shared vehicle availability.

The first shared vehicle detailed information 543 is depicted as a total travel time of 30 minutes that includes 4-minute walking time and 26-minute driving time (with a 5-minute delay). The first shared vehicle detailed information 543 further depicts a cost £4.30 arriving at 17:34 at the requesting user's destination (e.g., home). The second shared vehicle detailed information 545 is depicted as a total travel time of 38 minutes that includes 13-minute walking time and 25-minute driving time (with a 4-minute delay). The second shared vehicle detailed information 545 further depicts a cost £4.30 arriving at 17:42 at the requesting user's home. The second shared vehicle will require the user to walk 9-minute longer and the trip takes 8-minute longer than the first shared vehicle.

The third shared vehicle detailed information 547 is depicted as a total travel time of 39 minutes that includes 11-minute walking time and 28-minute driving time (with a 5-minute delay). The third shared vehicle detailed information 547 further depicts a cost £4.30 arriving at 17:43 at the requesting user's home. The third shared vehicle will require the user to walk 2-minute shorter but the trip takes 1-minute longer than the second shared vehicle.

In addition to the detailed information 543, 545, 547 of the vehicles, FIG. 5C illustrates a graphic travel time bar for each vehicle as 543', 545', 547', while the portion of the bar represents a length of time of walking vs. driving. For example, the graphic travel time bar 543' for the first vehicle has a first portion with a walking symbol representing walking 4-minute, and a second portion with a driving symbol representing driving 26-minute. As another example, the graphic travel time bar 545' for the second vehicle has a first portion with a walking symbol representing walking 13-minute, and a second portion with a driving symbol representing driving 25-minute.

Figure 6A:
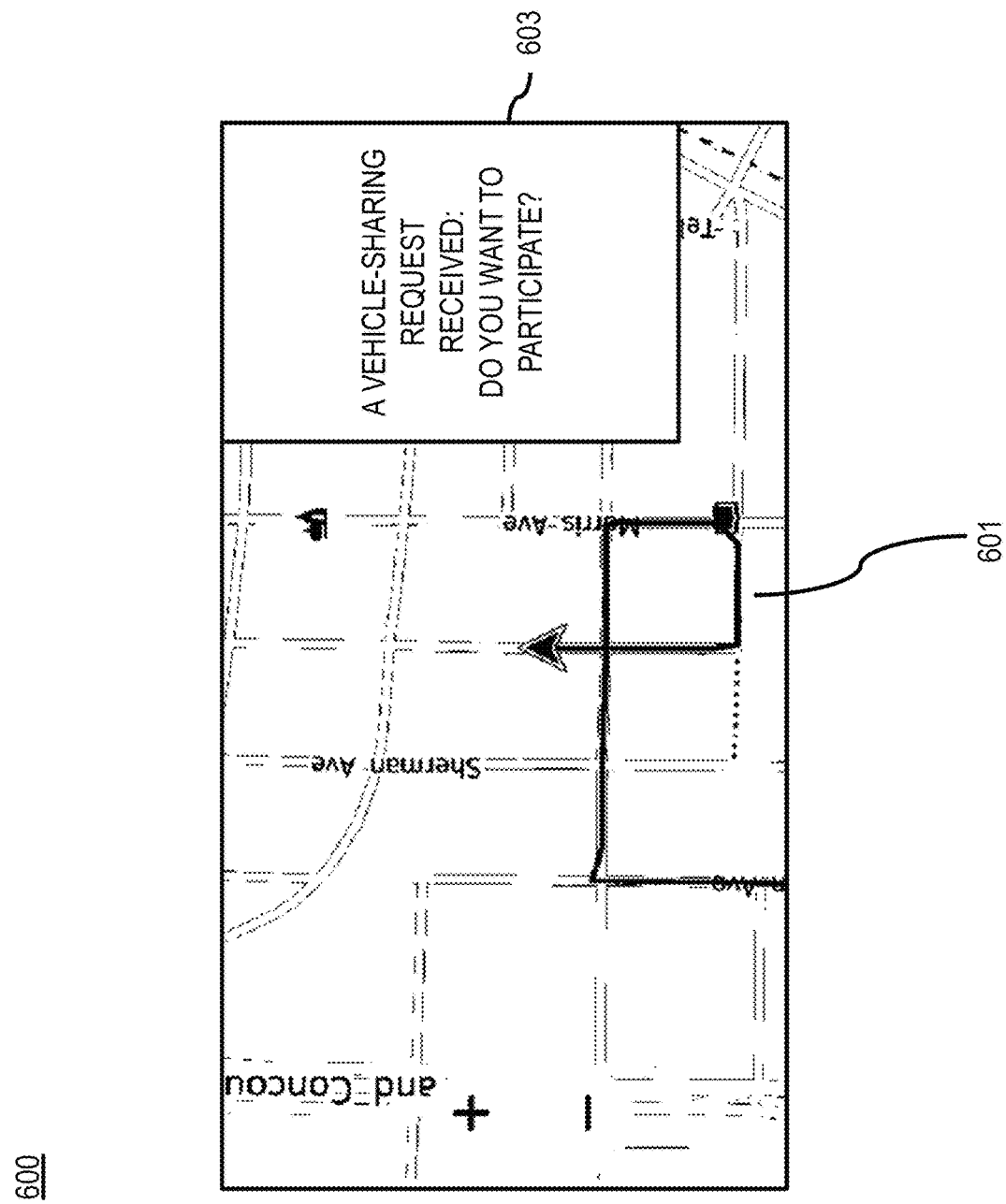
FIGS. 6A-6C are diagrams of user interfaces used in the processes for parking search and vehicle sharing, according to various embodiments.
Figure 6B:
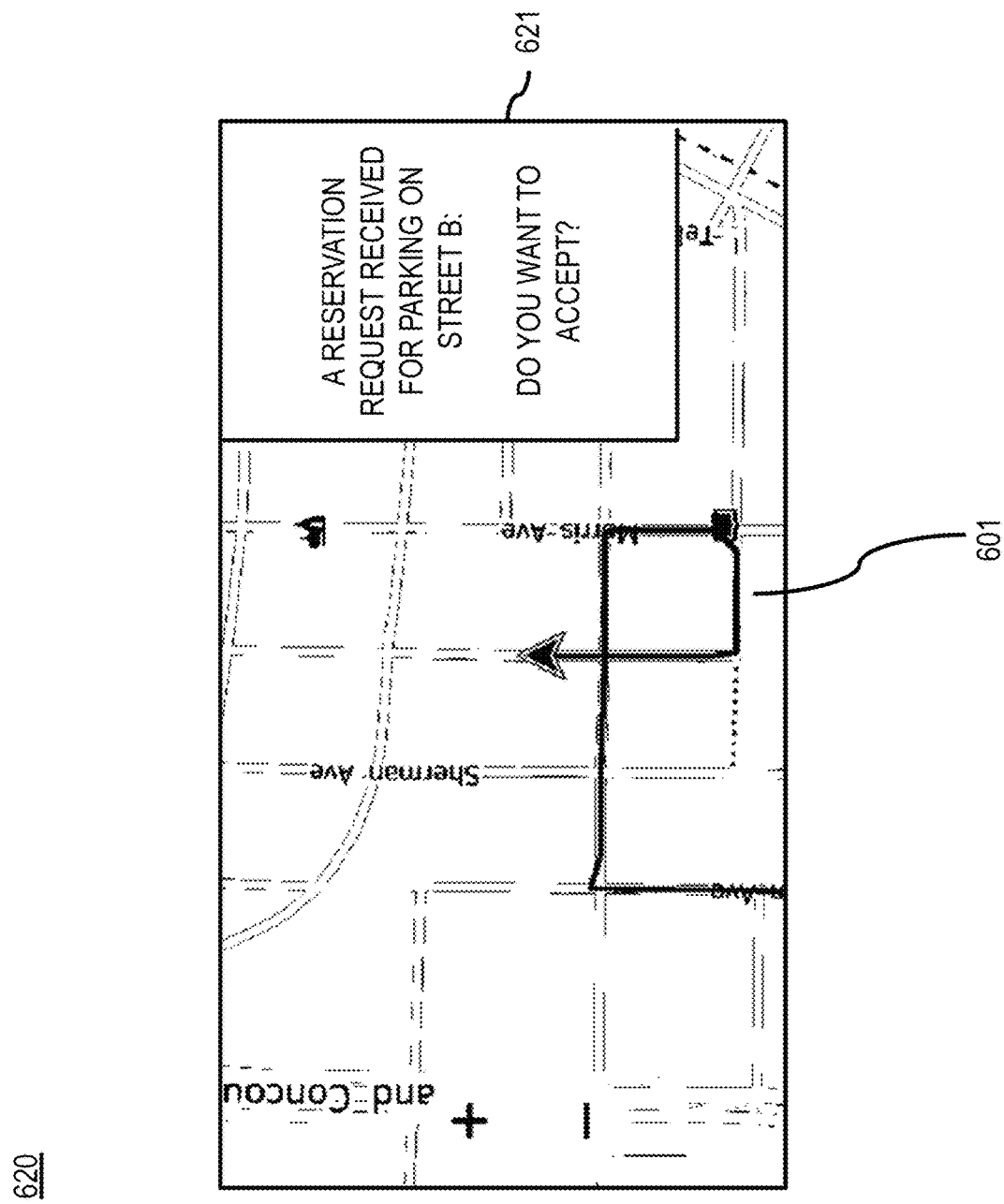
Figure 6C:
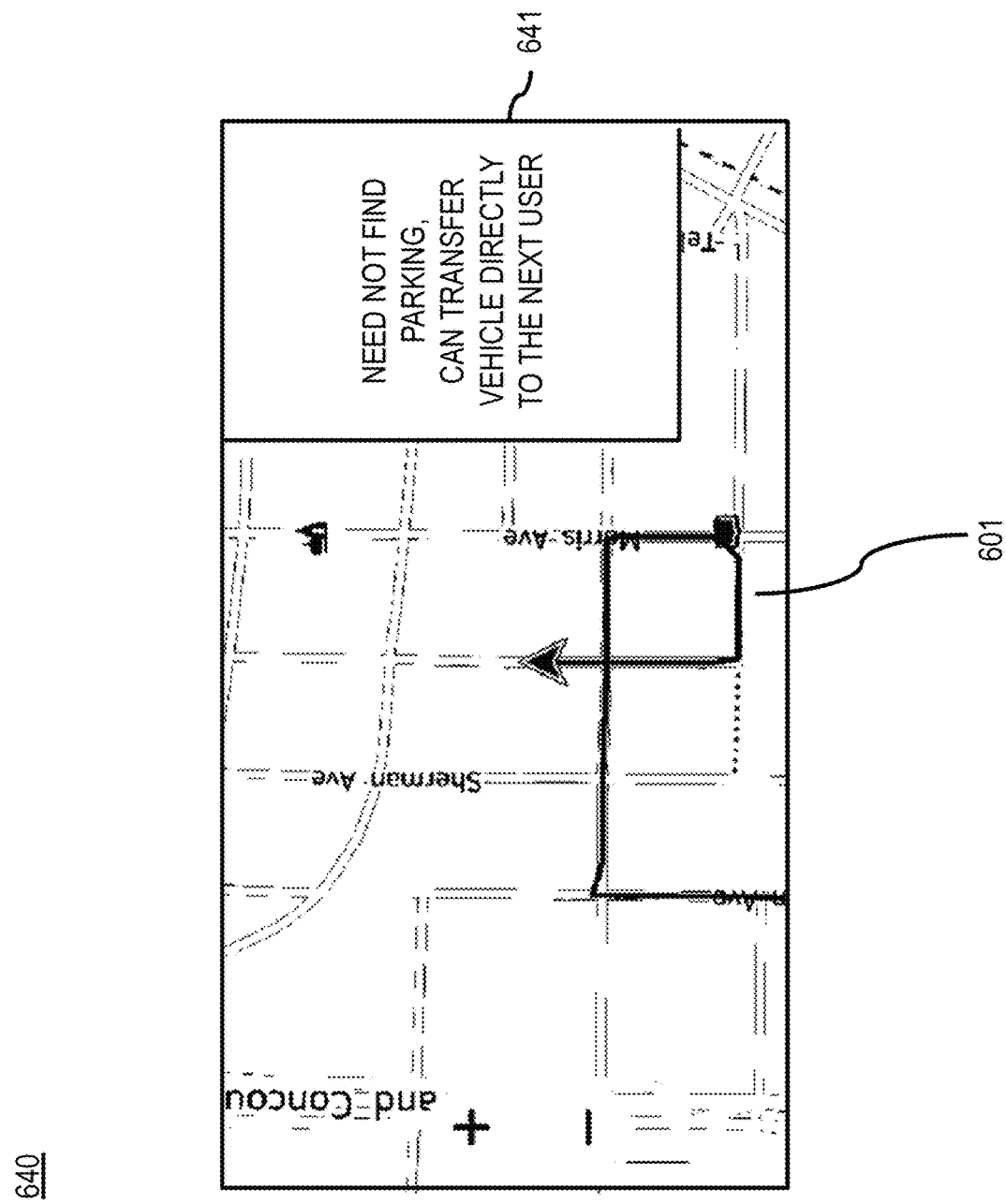

FIGS. 6A-6C are diagrams of user interfaces used in the processes for parking search and vehicle sharing, according to various embodiments. More specifically, FIGS. 6A-6B illustrate user interfaces that can be used in real-time by a driver of vehicle 103 participating in a shared vehicle availability service provided by the system 100.

For example, a user interface (UI) 600 presents a live view a vehicle trajectory 601 as the vehicle is traveling and searching for park spaces in a road network. In one embodiment, the trajectory 601 is continually processed (e.g., by the vehicle sharing platform 105 and/or the application 111) for parking search detection. In this example, parking spaces have been detected, and a vehicle sharing request has been received and presented as a notification 603 to the driver in FIG. 8A to ask the driver whether the driver would like to respond to the vehicle sharing request.

After responding yes to the vehicle sharing request, the driver is considered and selected by the user for reserving the vehicle, thereby receiving a vehicle reservation request as a notification 621 to the driver is shown in a user interface (UI) 620 in FIG. 6B to ask the driver whether the driver would like to accept the vehicle reservation request and meet the requesting user at a parking space on Street B. After accepting the vehicle reservation request, a notification 641 to the driver is shown in a user interface (UI) 640 in FIG. 6C to inform the driver that the vehicle need not find parking and can transfer directly to the next user. After receiving a positive response to the vehicle reservation request, the vehicle sharing platform 105 provides navigation information to the vehicle to route to the parking space on Street B.

The above-discussed embodiments combine different technologies (sensors, predictive parking, probability computation, multimodal routing, etc.) to provide a platform for mobility providers to share their data and get insights of parking search behaviors via combining many types of data sets, thereby determining shared vehicle availability and develop multi and intermodal parking and vehicle sharing solutions.

The above-discussed embodiments provides users more vehicle-sharing options when comparing routes to go to a place in software developer's kits (SDK), navigation applications, and/or autonomous vehicle management. The above-discussed embodiments increase usage of the vehicles by madding them "available/bookable" before being parked. The above-discussed embodiments allow the vehicles being parked for less time and increase turn over, as well as reduce parking search traffic.

The processes described herein for detecting an availability of a vehicle based on parking search behaviors may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
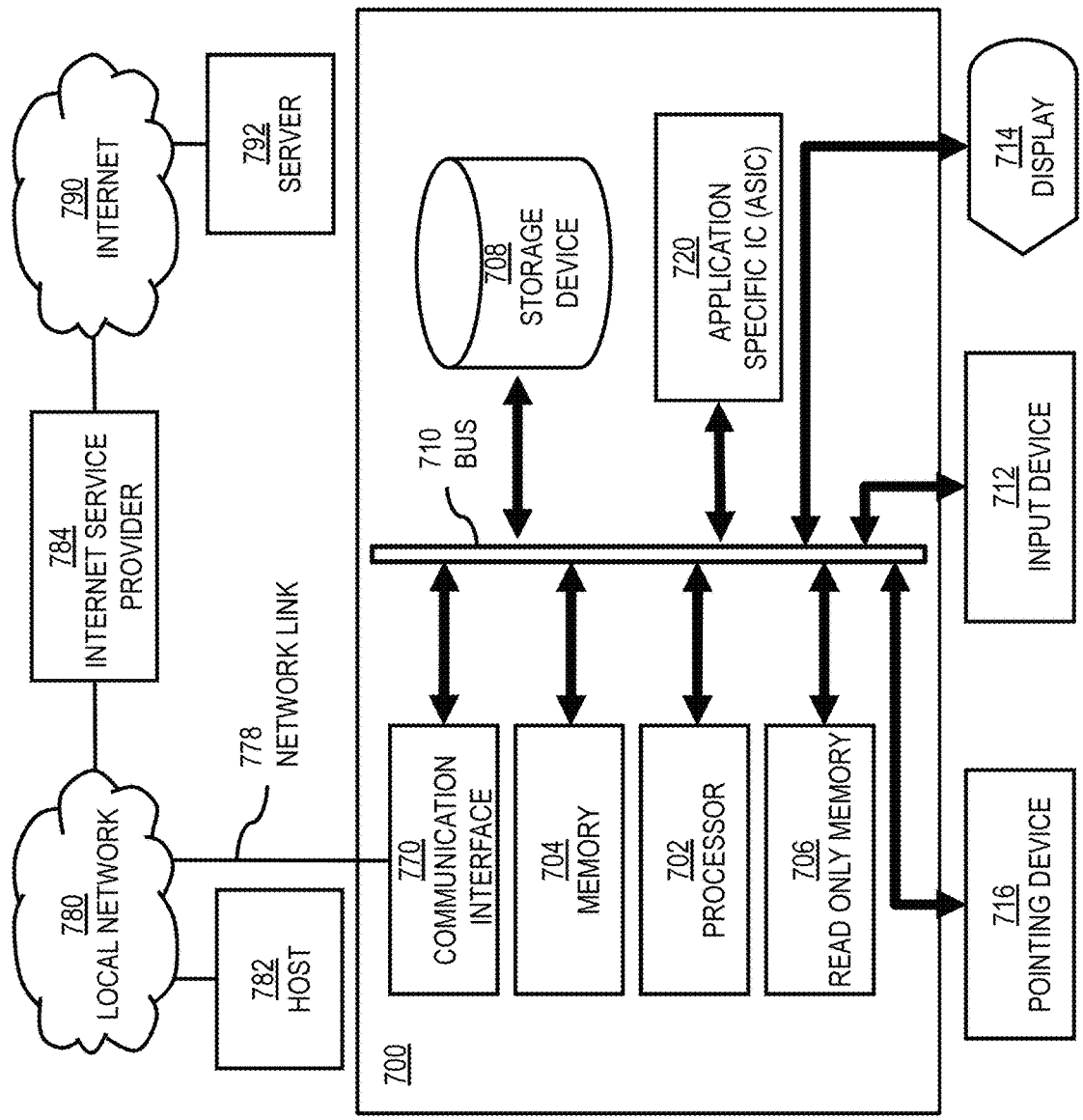
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide shared vehicle availability detection based on vehicle trajectory information as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of detecting an availability of a vehicle based on parking search behaviors.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to detecting an availability of a vehicle based on parking search behaviors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for detecting an availability of a vehicle based on parking search behaviors. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for detecting an availability of a vehicle based on parking search behaviors, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless devices, such as mobile computers like vehicle infotainment system, the communications interface 770 includes a radio band electromagnetic transmitter and receiver called a radio transceiver. In certain embodiments, the communications interface 770 enables connection to the communication network 77 for detecting an availability of a vehicle based on parking search behaviors to the UE 71.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of detecting an availability of a vehicle based on parking search behaviors.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 805 also stores the data associated with or generated by the execution of the inventive steps.

Figure 9:
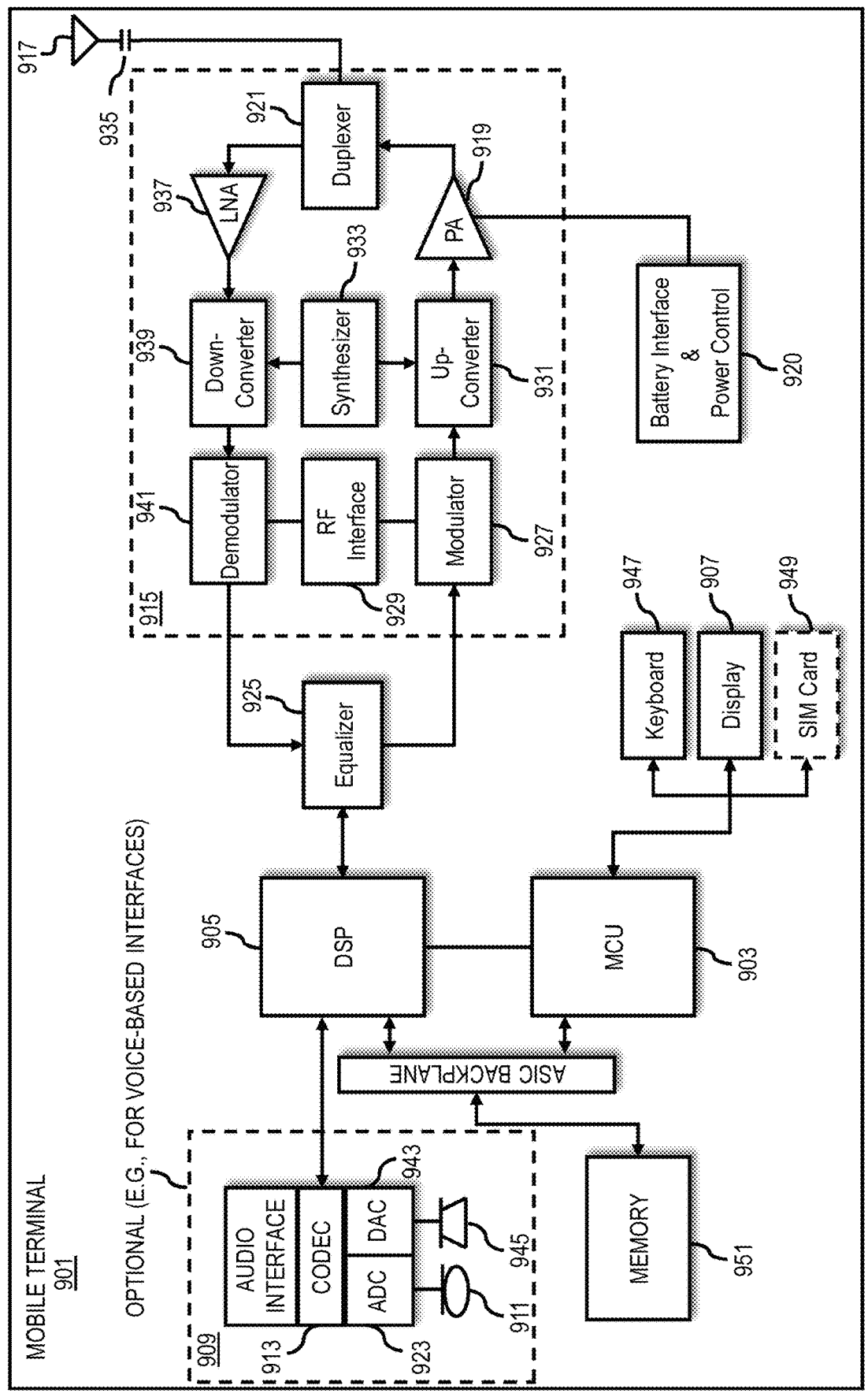
FIG. 9 is a diagram of a mobile terminal (e.g., mobile computer) that can be used to implement an embodiment of the invention.

FIG. 9 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 901, or a portion thereof, constitutes a means for performing one or more steps of detecting an availability of a vehicle based on parking search behaviors. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 903, a Digital Signal Processor (DSP) 905, and a receiver/transmitter unit. In one embodiment, wherein voice-based interaction and/or communications are supported at the mobile terminal, the mobile terminal may also include a microphone gain control unit and a speaker gain control unit. A main display unit 907 provides a display to the user in support of various applications and mobile terminal functions that perform or support the steps of detecting an availability of a vehicle based on parking search behaviors. The display 907 includes display circuitry configured to display at least a portion of a user interface of the mobile terminal (e.g., mobile telephone). Additionally, the display 907 and display circuitry are configured to facilitate user control of at least some functions of the mobile terminal. In embodiments supporting voice-based interactions and/or communications, an audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station (e.g., data and/or voice communications), which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, data to support detecting an availability of a vehicle based on parking search behaviors is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission through the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide shared vehicle availability detection based on vehicle trajectory information. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details (e.g., data and/or voice subscriptions), and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for detecting an availability of a vehicle comprising:

determining, by one or more processors of a platform, that the vehicle is engaged in a parking search behavior based on a deviation of the vehicle from an optimal route to a destination of a current user of the vehicle by a threshold value, wherein the threshold value is determined using a machine learning classifier on one or more of location sensor data or trajectory data associated with the vehicle;

computing, by the one or more processors, a probability that the vehicle will become available for use by another user at an estimated location within an estimated time period based on the parking search behavior, wherein the estimated location is within a threshold distance from one or more of the destination of the current user or the location of the other user;

designating, by the one or more processors, the availability of the vehicle for use by the other user based on the probability;

initiating, by the one or more processors, a presentation of a vehicle reservation request on a user interface within the vehicle based on the availability of the vehicle at the estimated location within the estimated time period;

receiving, by the one or more processors, an acceptance of the vehicle reservation request via the user interface;

reserving, by the one or more processors, the vehicle for use by the other user before the vehicle arrives at the estimated location; and autonomously navigating, by the one or more processors, the vehicle to the estimated location.

2. The method of claim 1, further comprising:

determining, by the one or more processors, that the current user is to terminate using the vehicle at the destination based on one or more of an indication by the current user, or historic vehicle usage behaviors of the current user, wherein the optimal route is a shortest or fastest route to the destination of the current user.

3. The method of claim 1, further comprising:

computing, by the one or more processors, another probability that the current user will terminate using the vehicle after parking based on historical trajectory data of the current user, wherein the availability is further based on the other probability.

4. The method of claim 3, wherein at least one of the probability or the other probability is computed with respect to the vehicle becoming available for use by the other user within a predetermined time, a predetermined distance, or a combination thereof specified by the other user.

5. The method of claim 1, wherein the estimated location, the estimated time period, the probability, or a combination thereof is further based on at least one of:

a proximity of the vehicle to the destination of the current user;

traffic data at the destination;

a type of the destination;

vehicle sensor data;

a proximity to a vehicle drop off area;

weather data;

availability of an alternate destination for the current user;

a number of passengers accompanying the current user; and a historical pattern regarding the availability of the vehicle.

6. The method of claim 1, wherein the availability of the vehicle for use by the other user is further based on parking availability data for a geographic area corresponding to the parking search behavior of the vehicle.

7. The method of claim 1, further comprising:

receiving a vehicle request from the other user; and identifying at least one vehicle nearby the other user based on a spatial proximity, a temporal proximity, or a combination thereof, wherein the vehicle is selected from among the at least one vehicle.

8. The method of claim 7, wherein the vehicle request specifies the spatial proximity, the temporal proximity, or a combination thereof based on an input by the other user.

9. The method of claim 1, further comprising:

after the acceptance of the vehicle reservation request, initiating, by the one or more processors, a presentation of a notification that the vehicle can be handed over to the other user without parking;

receiving, by the one or more processors, a positive response to the notification via the user interface; and providing, by the one or more processors, navigation information to route the vehicle to a handover location.

10. The method of claim 1, wherein the one or more processors further cause presenting, before the vehicle arrives at the estimated location, a notification indicating at least one of:

that the other user is requesting the availability of the vehicle, that the other user is requesting to share the vehicle, or that the vehicle will be re-routed to arrive closer to the other user than the estimated location.

11. The method of claim 1, further comprising:

determining, by the one or more processors, that re-routing the vehicle to pass closer to the other user has no impact on an estimated arrival time to the destination of the current user, that the re-routing increases a chance of finding a parking space, or a combination thereof;

causing, by the one or more processors, a presentation of a re-routing suggestion on the user interface based on the re-routing;

receiving, by the one or more processors, an acceptance of the re-routing suggestion via the user interface; and autonomously navigating, by the one or more processors, the vehicle based on the re-routing.

12. An apparatus comprising:

at least one processor; and at least one memory including computer program code for one or more programs, the at least one memory and the computer program code configured to, with the at least one processor, cause the apparatus of a platform to perform at least the following, determine that the vehicle is engaged in a parking search behavior based on a deviation of the vehicle from an optimal route to a destination of a current user of the vehicle by a threshold value, wherein the threshold value is determined using a machine learning classifier on one or more of location sensor data or trajectory data associated with the vehicle;

compute a probability that the vehicle will become available for use by another user at an estimated location within an estimated time period based on the parking search behavior, wherein the estimated location is within a threshold distance from one or more of the destination of the current user or the location of the other user;

designate the availability of the vehicle for use by the other user based on the probability;

initiate a presentation of a vehicle reservation request on a user interface within the vehicle based on the availability of the vehicle at the estimated location within the estimated time period;

receive an acceptance of the vehicle reservation request via the user interface;

reserve the vehicle for use by the other user before the vehicle arrives at the estimated location; and autonomously navigate the vehicle to the estimated location.

13. The apparatus of claim 12, wherein the apparatus is further caused to:

calculate another probability that the other user will wait for the vehicle to arrive at the destination of the current user, or to arrive at a handover location that is different from the destination of the current user, based on profile and context parameters of the other user.

14. The apparatus of claim 13, wherein the apparatus is further caused to:

determine a handover probability based on the probability that the vehicle will become available for use by the other user and the other probability of the other user will wait for the vehicle to arrive.

15. The apparatus of claim 14, wherein the handover probability is a product of the probability that the vehicle will become available and the probability of the other user will wait for the vehicle.

16. The apparatus of claim 12, wherein the apparatus is further caused to:

retrieve the trajectory data of the vehicle; and compare the trajectory data of the vehicle with a parking search behavior database to determine that the vehicle is engaged in the parking search behavior.

17. The apparatus of claim 12, wherein the apparatus is further caused to:

determine an average time to park the vehicle based on a spatial proximity to the other user, a temporal proximity to the vehicle, or a combination thereof, wherein the probability is computed based on the average time to park.

18. A non-transitory computer-readable storage medium carrying one or more sequences of one or more instructions which, when executed by one or more processors, cause an apparatus of a platform to at least perform the following steps:

determining that the vehicle is engaged in a parking search behavior based on a deviation of the vehicle from an optimal route to a destination of a current user of the vehicle by a threshold value, wherein the threshold value is determined using a machine learning classifier on one or more of location sensor data or trajectory data associated with the vehicle;

computing a probability that the vehicle will become available for use by another user at an estimated location within an estimated time period based on the parking search behavior, wherein the estimated location is within a threshold distance from one or more of the destination of the current user or the location of the other user;

designating the availability of the vehicle for use by the other user based on the probability;

initiating a presentation of a vehicle reservation request on a user interface within the vehicle based on the availability of the vehicle at the estimated location within the estimated time period;

receiving an acceptance of the vehicle reservation request via the user interface;

reserving the vehicle for use by the other user before the vehicle arrives at the estimated location; and autonomously navigating the vehicle to the estimated location.

19. The non-transitory computer-readable storage medium of claim 18, wherein the apparatus is further caused to perform:

receiving a vehicle request from the other user; and identifying at least one vehicle that is nearby the other user and will become available based on a threshold probability, wherein the vehicle is selected from among the at least one vehicle based on a determination that the probability meets the threshold probability.

20. The non-transitory computer-readable storage medium of claim 19, wherein the apparatus is further caused to perform:

computing another probability based on a threshold time period that the other user will wait and/or based on a threshold distance that the other user will wait to use the vehicle, wherein the vehicle is selected from among the at least one vehicle further based on the other probability.

* * * * *